(12) United States Patent
Upendran et al.

(10) Patent No.: US 7,516,092 B2
(45) Date of Patent: Apr. 7, 2009

(54) SYSTEM AND METHOD FOR PERFORMING PURCHASE TRANSACTIONS UTILIZING A BROADCAST-BASED DEVICE

(75) Inventors: Manish Upendran, San Jose, CA (US); Hamid-Reza Behhnam-Denkordy, Redwood City, CA (US); Valla Vakilli, Sunnyvale, CA (US); Matthew Rowlen, San Mateo, CA (US)

(73) Assignee: Yahoo!Inc., Sunnyvale, CA (US)

( * ) Notice: Subject to any disclaimer, the term of this patent is extended or adjusted under 35 U.S.C. 154(b) by 42 days.

(21) Appl. No.: 11/867,863

(22) Filed: Oct. 5, 2007

(65) Prior Publication Data

US 2008/0033840 A1 Feb. 7, 2008

Related U.S. Application Data

(62) Division of application No. 10/752,620, filed on Jan. 6, 2004, now Pat. No. 7,346,556.

(51) Int. Cl.
*G06Q 30/00* (2006.01)
(52) U.S. Cl. .............................. 705/26; 705/10; 725/10; 725/13
(58) Field of Classification Search ........................ None
See application file for complete search history.

(56) References Cited

U.S. PATENT DOCUMENTS 5,539,822 A * 7/1996 Lett ............................ 380/211
5,600,364 A * 2/1997 Hendricks et al. ............... 725/9
6,718,551 B1 * 4/2004 Swix et al. ..................... 725/32
6,918,131 B1 * 7/2005 Rautila et al. .................. 725/34

FOREIGN PATENT DOCUMENTS

JP 2002094965 A * 3/2002

OTHER PUBLICATIONS

Law, Chun Wah Eric, "The theory of interactive content-tiggered consumer action: Interactive content theory"; 2000; ProQuest Info &Learning. ; vol. 61/10-A Of Dissertation Abstracts International p. 4089.*

* cited by examiner

*Primary Examiner*—F. Zeender
*Assistant Examiner*—Fateh M Obaid
(74) *Attorney, Agent, or Firm*—Seth H. Ostrow; Ostrow Kaufman & Frankl LLP

(57) ABSTRACT

Disclosed is a system and method for performing purchase transactions utilizing a broadcast-based device. In one embodiment, an online user interface is used to enter a plurality of user preferences that are then used to tailor what purchase options will be available to a client-side broadcast-based device. In another embodiment, product purchases may be made using a broadcast-based device, where the purchase transaction options and setting have been previously defined in an online environment. In yet another embodiment, the product purchase options presented are based on predetermined criteria, such as previous user activity.

12 Claims, 26 Drawing Sheets

FULL SCREEN

Welcome, John | Sign Out | Full Screen | My Account | Help

Programming » Preferences » Premium » | My Services / My Home

Alert:
Movie is now available in my Movies ☐ Cast

Search [Choose one ▼] [____] [Search]

Scheduled Recordings:
Mon 8:00pm Basketball (1 hour 45 min)
Mon 9:00pm Basketball (1 hour 45 min)
Tue 7:45pm Basketball (1 hour 45 min)
Wed 8:00pm Basketball (1 hour 45 min)

February

| | 1 |
|---|---|
| 2 3 4 5 6 7 8 |
| 9 10 11 12 13 14 15 |
| 16 17 18 19 20 21 22 |
| 23 24 25 26 27 28 |

560

<< Earlier

| | 7:00 | 7:30 | 8:00 | 8:30 | 9:00 |
|---|---|---|---|---|---|
| 2 KTVU | Show 2-1 ⊙ | Show 2-2 ⊙ | Show 2-3 ⊙ | | Show 2-4 ⊙ |
| 3 NBC | Show 3-1 ⊙ | Show 3-2 ⊙ | Show 3-3 ⊙ | | Show 3-4 ⊙ |

Scheduled Recordings:
Mon 8:00pm Basketball (1 hour 45 min)
Mon 9:00pm TAKEN-Episode 4 (1 hour 45 min)
Tue 7:45pm 24 (1 hour 45 min)
Wed 8:00pm The Movie 1 (1 hour 45 min)

| Delete Selected | | | |
|---|---|---|---|
| Name | Size | Media Type | |
| ☐ Show 1 – Episode 143 | 1.5 GB | FS Media (medium) | |
| ☐ Movie 2 – Movie | 3.0 GB | FS Media (medium) | |
| ☐ 24 – Episode 8 | 2.5 GB | FS Media (medium) | |
| ☐ Cartoons – Episode 382 | 1.5 GB | FS Media (medium) | |
| ☐ Show 2 – Episode 16 | 1.5 GB | FS Media (medium) | |
| ☐ Basketball 1 | 2.5 GB | FS Media (medium) | |
| ☐ Photos Albm – Trip to Mexico | 1.0 GB | FS Media (medium) | |

FIG. 5E

Preferences — 575

General — 575a-3

| | | | |
|---|---|---|---|
| Multiple Users: | ☐ Enable 575a-1<br>☑ Disable 575a-2 | Automatic Updates: | ☐ Enable<br>☐ Disable |

> 575a

Parental Controls

| | | | |
|---|---|---|---|
| ☐ Enable Timed Blockout<br>☐ Enable Channel Blockout<br>575b-2<br>575b-1 | Manual Controls: | Blockout Time<br>[8:00pm–9:00pm]<br>Block Channels<br>[76] | 575b-3<br>575b-4 |

> 575b

Channel Guide

| | | | |
|---|---|---|---|
| Add to Favorites: [34] 575c-1 | | Remove from Favorites: [110] | 575c-3 |
| Views<br>Choose View: [1 hour] 575c-2 | | Rating:<br>Choose Rating: [General] | 575c-4 |

> 575c

Movies/Videos On Demand (VOD)

| | | | |
|---|---|---|---|
| Select: [Movie 3] 575d-1 | | Remove: [Movie B] | 575d-3 |
| Add: [Movie 56] 575d-2 | | | |

> 575d

Overlays

| | | | |
|---|---|---|---|
| Add: [Financial Ticket] 575e-1 | | Current Overlays: [Horoscope] | 575e-2 |

> 575e

Photos

| | | | |
|---|---|---|---|
| Select: [Mexico Vacation] | | Sync with Yahoo! Photos: [SoCAL] | 575f-3 |
| Resolution: [Fine] 575f-2 | 575f-1 | | |

> 575f

Auctions

Select: [All of Auctions] 575g-1

> 575g

Games

| | | |
|---|---|---|
| Select: [Diamond Solitaire] 575h-1 | Delete: [Poker] | 575h-2 |

> 575h

Personals

⋮ [Search] 575i-1

> 575i

Miscellaneous

SYSTEM AND METHOD FOR PERFORMING PURCHASE TRANSACTIONS UTILIZING A BROADCAST-BASED DEVICE

CLAIM OF PRIORITY

This application is a divisional application and claims the benefit of U.S. application Ser. No. 10/752,620, entitled "System and Method for Performing Purchase Transactions Utilizing a Broadcast-Based Device", filed on Jan. 6, 2004 and which claims priority to U.S. Provisional application Ser. No. 60/498,899, entitled "System and Method for Integrating Data with Broadcast Content," filed on Aug. 29, 2003.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates in general to a system and method for integrating personalized data, services, content and community with broadcasted, recorded and/or downloaded content. More particularly, the present invention relates to purchase transactions utilizing a broadcast-based device.

2. Background of the Invention

Currently, the television viewing experience is a homogenous experience devoid of virtually any personalization. While users may be able to identify and choose from a set of favorite channels, there are few additional means in which a user may personalize their TV experience.

In contrast, substantial strides have been taken to personalize the online experience. For example, by registering with a given website, users are often able to customize the look and feel of the site. Similarly, users are often given options to specify what type of content they would like presented to them.

Unfortunately, there is yet to be a way to customize a user's TV viewing experience as has been the case in the online context. Accordingly, there is a need in the art to not only provide a customized TV viewing experience, but also a TV viewing experience that incorporates a user's online preferences and habits into their TV experience.

BRIEF SUMMARY OF THE INVENTION

A system and method for performing purchase transactions utilizing a broadcast-based device is disclosed. In one embodiment, a system includes a user computer coupled to a data network, where the user computer displays a user interface that is usable to enter a plurality of purchase preferences. The system further includes a broadcast-based client-side device coupled to the network, where the broadcast-based client-side device receives user preference data from the data network based on the plurality of purchase preferences, and also receives broadcast programming content from a broadcast source. In one embodiment, the system includes a display to display a plurality of purchase options based on the plurality of purchase preferences, and a user input device to select from among the plurality of purchase options, and to consummate a purchase transaction.

Other embodiments are disclosed herein.

BRIEF DESCRIPTION OF THE DRAWINGS

FIG. 5D illustrates one embodiment of the Electronic Programming Guide provided through the use of the online user interface of FIG. 5C;

FIG. 5E illustrates one embodiment of the Schedule Recordings provided through the use of the online user interface of FIG. 5C;

FIG. 5F illustrates one embodiment of the Preferences menu provided in accordance with the online user interface of FIG. 5C.

DETAILED DESCRIPTION OF EXEMPLARY EMBODIMENTS

Figure 1A:
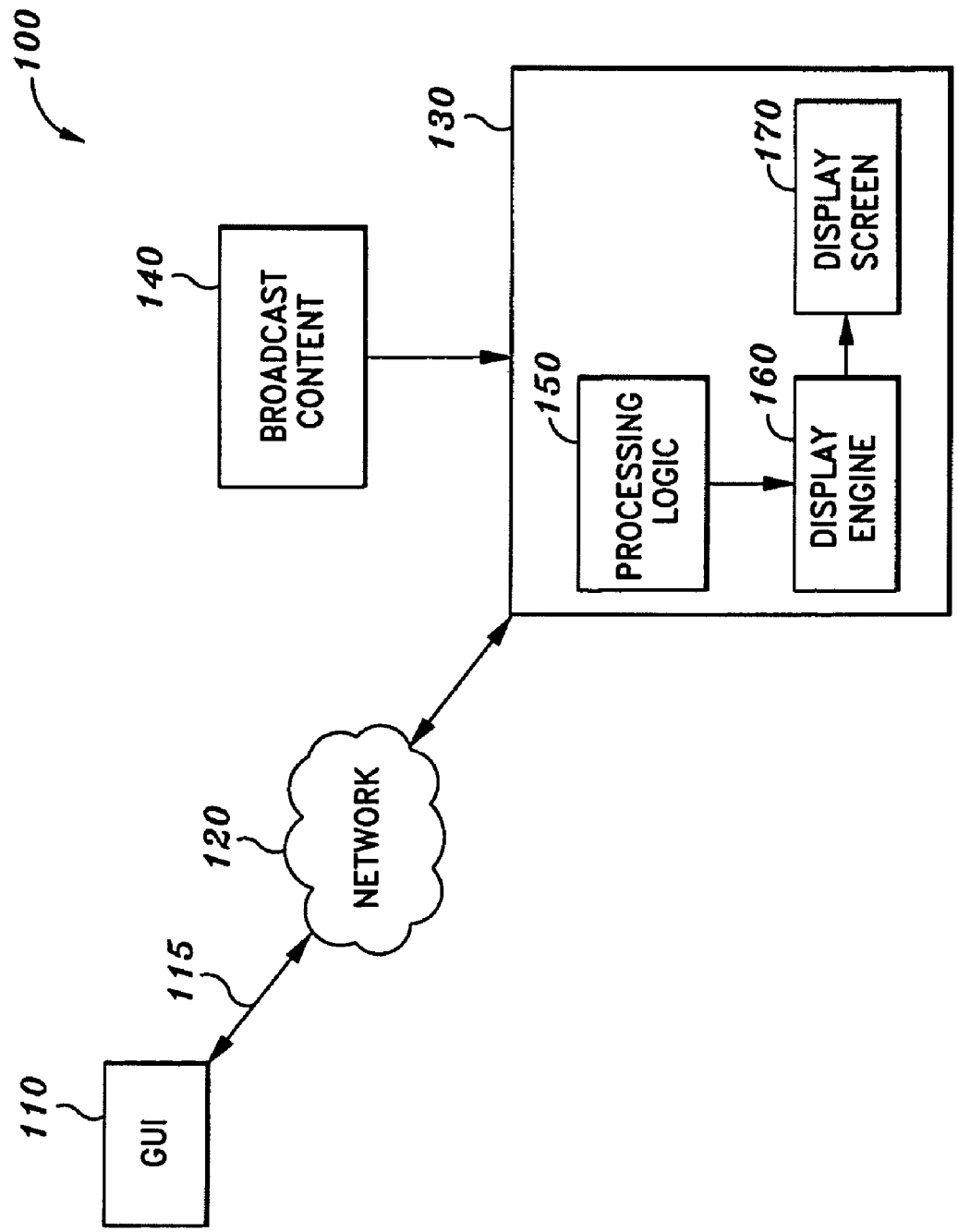
FIGS. 1A-1C depict simplified system diagrams of one or more aspects of the invention, according to one or more embodiments.

A system and method for performing purchase transactions utilizing a broadcast-based device is disclosed. One aspect of the invention is to use an online graphical user interface (GUI) to set a plurality of user preferences and settings which tailors and formats non-broadcast content and services available via a client-side device. In one embodiment, this GUI is used to set various purchase options for the user, such as payment preferences and delivery preferences. By entering user preferences, the online preferences and/or habits may be incorporated into a user's viewing experience, such as a television viewing experience or to utilize available services provided by website, a server or any other medium. Once the user's preferences have been specified, the user may access and/or incorporate his/her preferences in using available services, from any device that is connected to a network (such as a local area network, wide area network, a global network such as the Internet, etc.).

Another aspect of the invention is to enable a user to make product purchases using a broadcast-based device (e.g., television), where the purchase transaction options and setting have been previously defined in an online environment (e.g., using an online GUI). By way of a non-limiting example, such purchase options may include method of payment, account balances, product preference information and product delivery preferences.

Yet another aspect of the invention is to present product purchase options to a user while viewing broadcasted content. In one embodiment, the product purchase options presented are based on predetermined criteria, such as the category of content being viewed downloaded/recorded, previous content the user has viewed/downloaded/recorded, online content search queries, most popular product purchases, etc.

There is also currently no means for users to take their user experiences to different mediums like a personal computer, television etc. The data and content delivered is distinct among the various mediums. One embodiment of the invention bridges this gap by providing a method for making the data and content ubiquitous on the network. It provides a means to deliver content to differing user interfaces and devices while allowing the user to retain their personalization.

In accordance with the practices of persons skilled in the art of computer programming, the invention is described below with reference to symbolic representations of operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations such as in system memory, as well as other processing of signals. The memory locations where data bits are maintained are physical locations that have particular electrical, magnetic, optical, or organic properties corresponding to the data bits. Thus, the term "server" is understood to include any electronic device that contains a processor, such as a central processing unit.

When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Referring now to FIG. 1A, system 100 includes GUI 110 which may be used to input user preferences and/or personalized information. Based on the user input from GUI 110, non-broadcast content/data 115 may then be communicated to a client-side system 130 over a network 120. It should of course be appreciated that non-broadcast content/data 115 may include user-preference data, multimedia content and any other form of non-broadcast data. In the embodiment of FIG. 1A, the client-side system 130 may also receive broadcast content 140 and allow for simultaneous presentation of both non-broadcast content 115 and broadcast content 140 within the same user experience. One embodiment of integrating non-broadcast content 115 and broadcast content 140 is described in co-pending U.S. patent application Ser. No. 10/752761, entitled "System and Method for Integrating Broadcast and Non-broadcast Content," filed on Jan. 6, 2004, which is assigned to the assignee of the present application, and incorporated herein by reference.

Continuing to refer to FIG. 1A, client-side system 130 is depicted as including processing logic 150, display engine 160 and display screen 170. While in one embodiment, processing logic 150 is a set-top box (STB) device, it should equally be appreciated that other connected devices with similar capabilities may be used to receive, decode and process both non-broadcast content/data 115 and broadcast content 140.

Processing logic 150 communicates with both network 120 and display engine 160, which may be used to render image/video for presentation on display screen 170. Thus, processing logic 150 may provide information back to a back-end system (not shown). In one embodiment, this information may relate to user viewing habits of broadcast content 140. While in one embodiment, display engine 160 and display screen 170 comprise a television, they may similarly comprise other broadcast-content-based display devices.

Figure 1B:
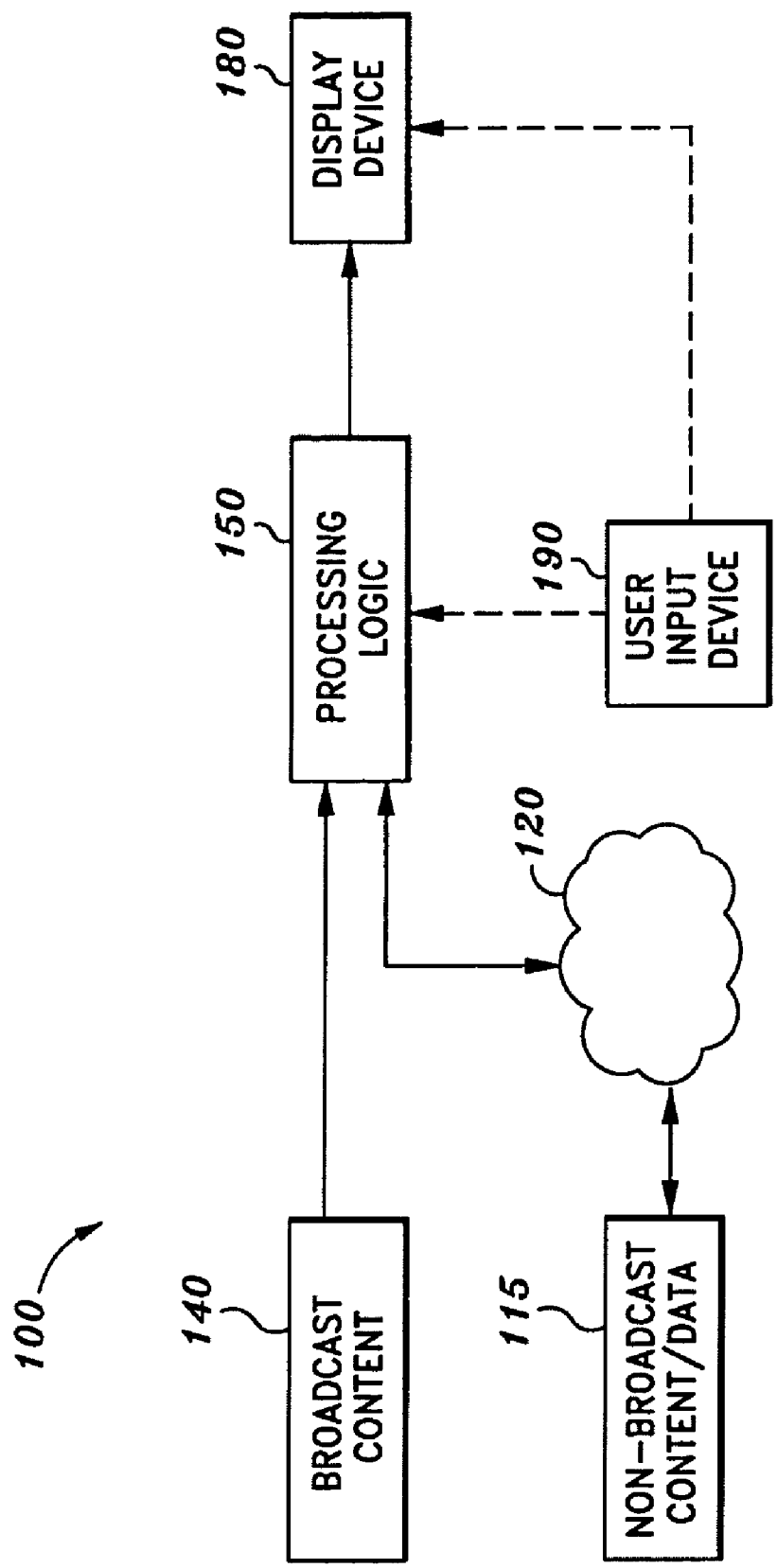

FIG. 1B depicts another embodiment of system 100 in which non-broadcast content/data 115 and broadcast content 140 are provided to processing logic 150, which in one embodiment may be a STB device. Processed image/video data may then be provided to display device 180. It should further be appreciated that processing logic 150 may further include recording functionality, such as the functionality provided by a digital video recorder (DVR). User input 190 may optionally be used to communicate with processing logic 150 and/or display device 180 for display control, channel selection, feature selection and the like. In one embodiment user input device 190 is a remote-control-type device. While in one embodiment user input device is a remote-control-type device, it may also be any other input means, such as a keyboard, voice recognition, touch screen, etc.

Figure 1C:
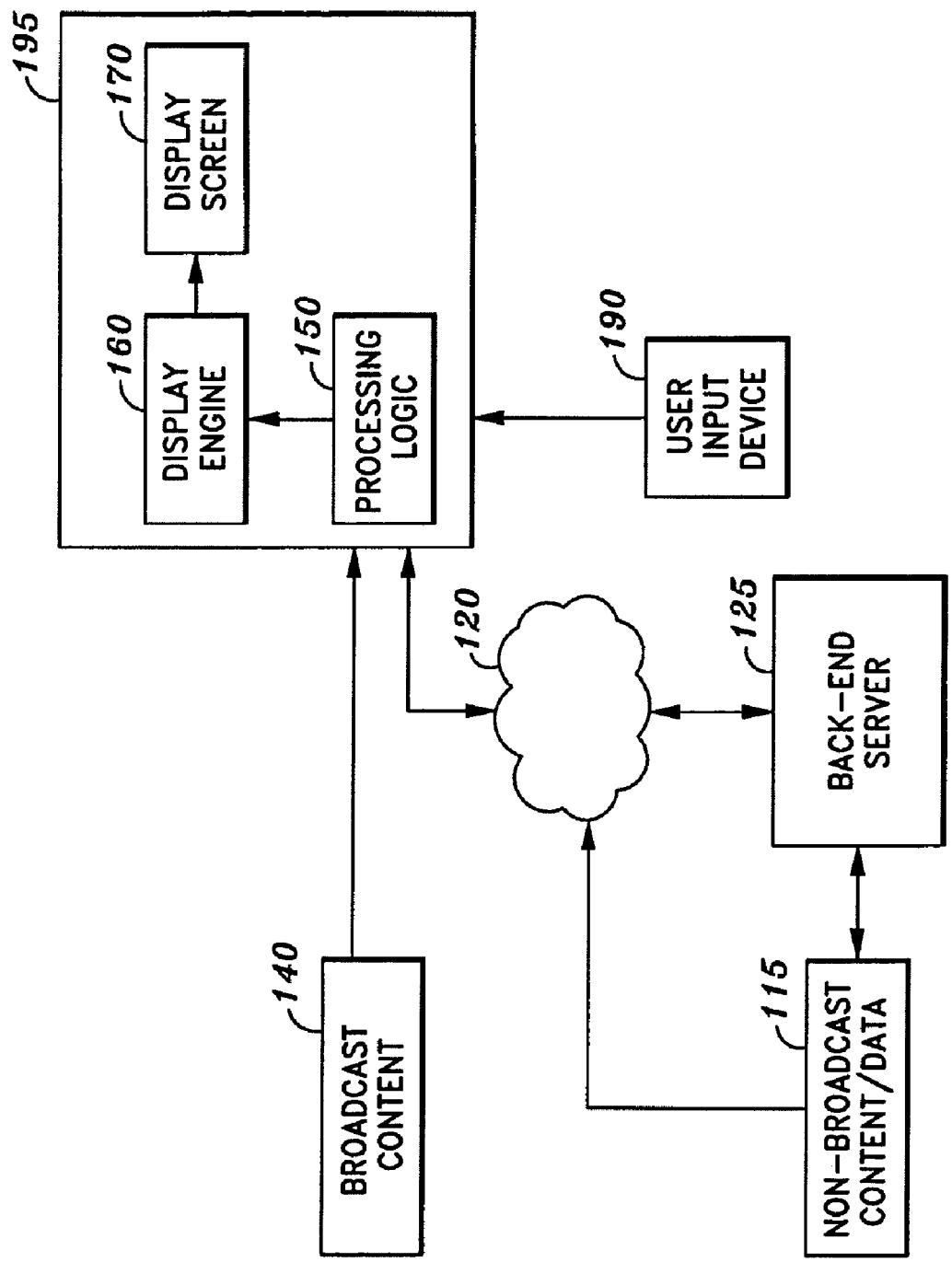

Referring now to FIG. 1C, yet another embodiment of system 100 is depicted. In this embodiment, non-broadcast content/data 115 and broadcast content 140 are provided to display device 195, which includes processing logic 150, display engine 160 and display screen 170. In one embodiment, display device 195 is a television with built in processing logic which provides the functionality for decoding and processing the incoming data streams. It should further be appreciated that DVR-type device (not shown) may be incorporated into display device 195 or, alternatively, coupled to display device 195. User input device 190 may then be used to make on-screen selections based on available menu options and/or available content.

While non-broadcast content/data 115 may be provided by other processing logic devices coupled to network 120 according to the user preferences entered via GUI 110, it may also come from a third-party online source (music database, movie trailer database, etc.) that is accessed in accordance with the various user selections and preferences entered via GUI 110. Moreover, non-broadcast content/data 115 may be provided to or from a back-end server 125 that is also coupled to network 120.

Figure 2A:
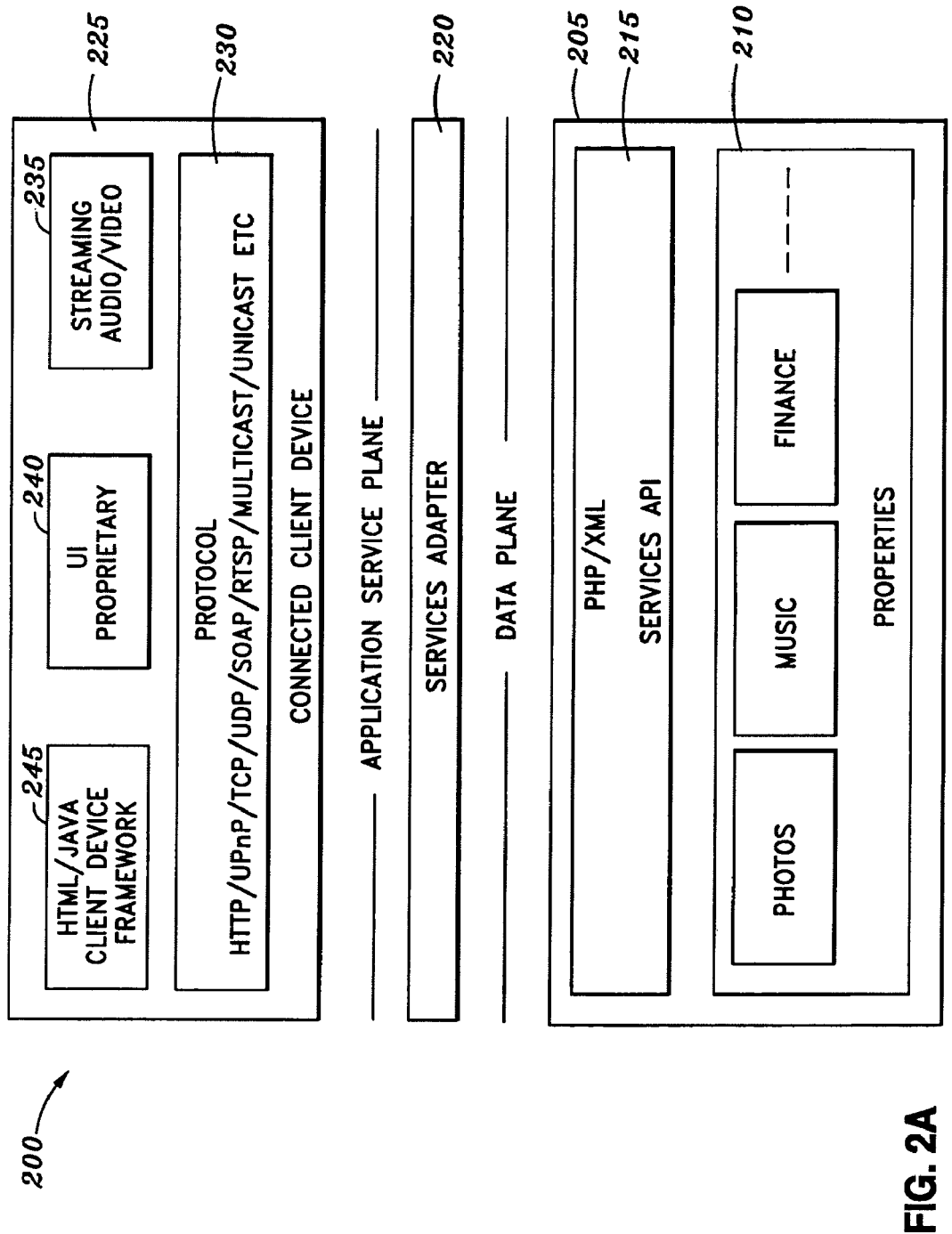
FIGS. 2A-2C depict additional system-level embodiments of one or more aspects of the invention.

Referring now to FIG. 2A, system 200 is another embodiment of the invention in which properties/services element 210 delivers a service to a client-side device 225 (e.g., client-side system 130, processing logic 150, display device 195, etc.) via a data plane 205 and an application service plane 230 comprised of a services adapter 220. In one embodiment, the data plane 205 retrieves data from available properties/services 210 (e.g., content, services, etc.) via the Services API 215. In one embodiment, the Services API 215 may be used to provide uniform access to content and services from underlying properties/services 210. While the Services API 215 may be implemented via standard data protocols (e.g., PHP, XML, SOAP, etc.), other protocols may similarly be used as necessary to retrieve the data. The Services API 215 may function to wrap the existing properties/services 210 in a common interface or, alternatively, may provide a translation layer for external requests. For example, the internal communication between the Service API 215 and properties/services element 210 may be via PHP, while the external API may be via XML.

Continuing to refer to FIG. 2A, application service plane 230 is comprised of a services adapter 220 which may function as the entry point for all client-side requests. It should be appreciated that the service adapter 220 may reside either as a client adapter or directly on a back-end server (e.g., back-end server 125), or as an independent adapter connected via a network to both the data plane 205 and the client device 225. The services adapter 220 will be discussed in more detail below with reference to FIG. 2B. It should further be appreciated that the client device 225 may also directly retrieve a data stream from the Service API 215 via the Data Plane 205 if it has the capability to process the data directly. By way of example, an XML-aware device can directly request data from the Service API 215 relating to say stock quotes, and present it as appropriate in a proprietary user interface 240. The client device 225 may also directly communicate to the properties/services element 210 in order to stream content to it. For example, to send/receive audio stream from the Yahoo Launch or a video stream from Yahoo Movies.

Figure 2B:
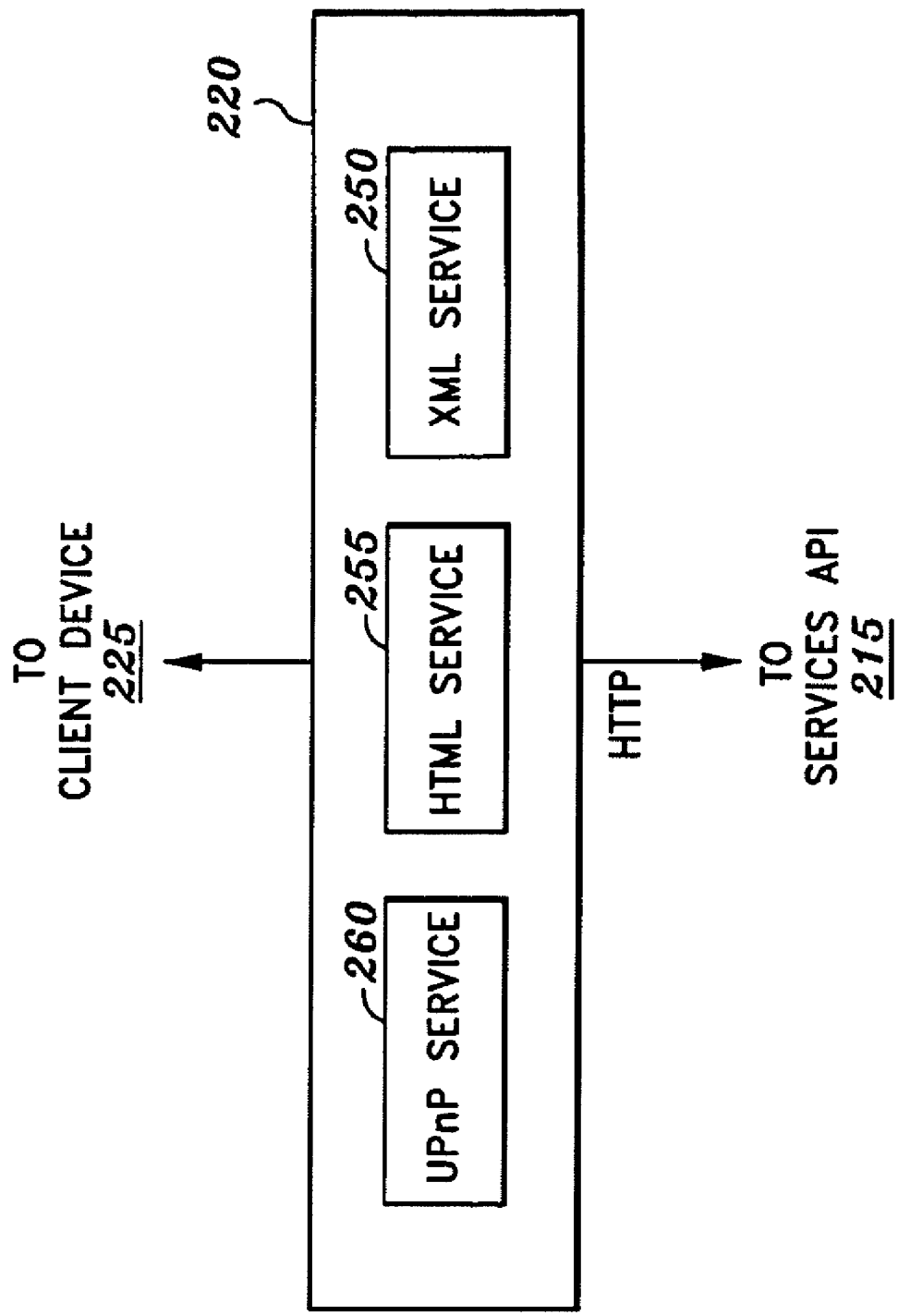

FIG. 2A further depicts certain aspects of the client-side device 225 (as will be discussed in more detail below with reference to FIG. 2C), including the streaming audio/video 235 storage, proprietary user interface (UI) 240 and processing logic module 245. Referring now to FIG. 2B, one embodiment of certain aspects of a services adapter 220 is depicted. In particular, services adapter 220 is shown comprising an XML service module 250, HTML service module 255 and UPnP service module 260. The services adapter 220 may be responsible for i) acting as the point of interface between client-side devices and the Services API 215, ii) marshalling data from the data plane 205 based on client-side data requirements, and iii) applying the appropriate UI transformation as necessary on the returned data before forwarding to the client-side device. In one embodiment, the role of the services adapter 220 is to provide services to the client in any manner required using any protocol requires. The adapters (e.g., XML, HTML, UPnP, etc.) are only some examples of possible service adapters. Furthermore, the role of UI transformation may be done either in the service adapter 220 or directly on the client device 225 as appropriate for the device. In one embodiment, there may be multiple service adapters on a network responsible for different services. For example, a service adapter 220 catering to finance may be different from one delivering the movie content service. Alternatively, services adapters may be defined in terms of the delivery protocol. For example, the XML service adapter may be separate from a HTML service adapter and may cater to different client devices on the network.

Figure 2C:
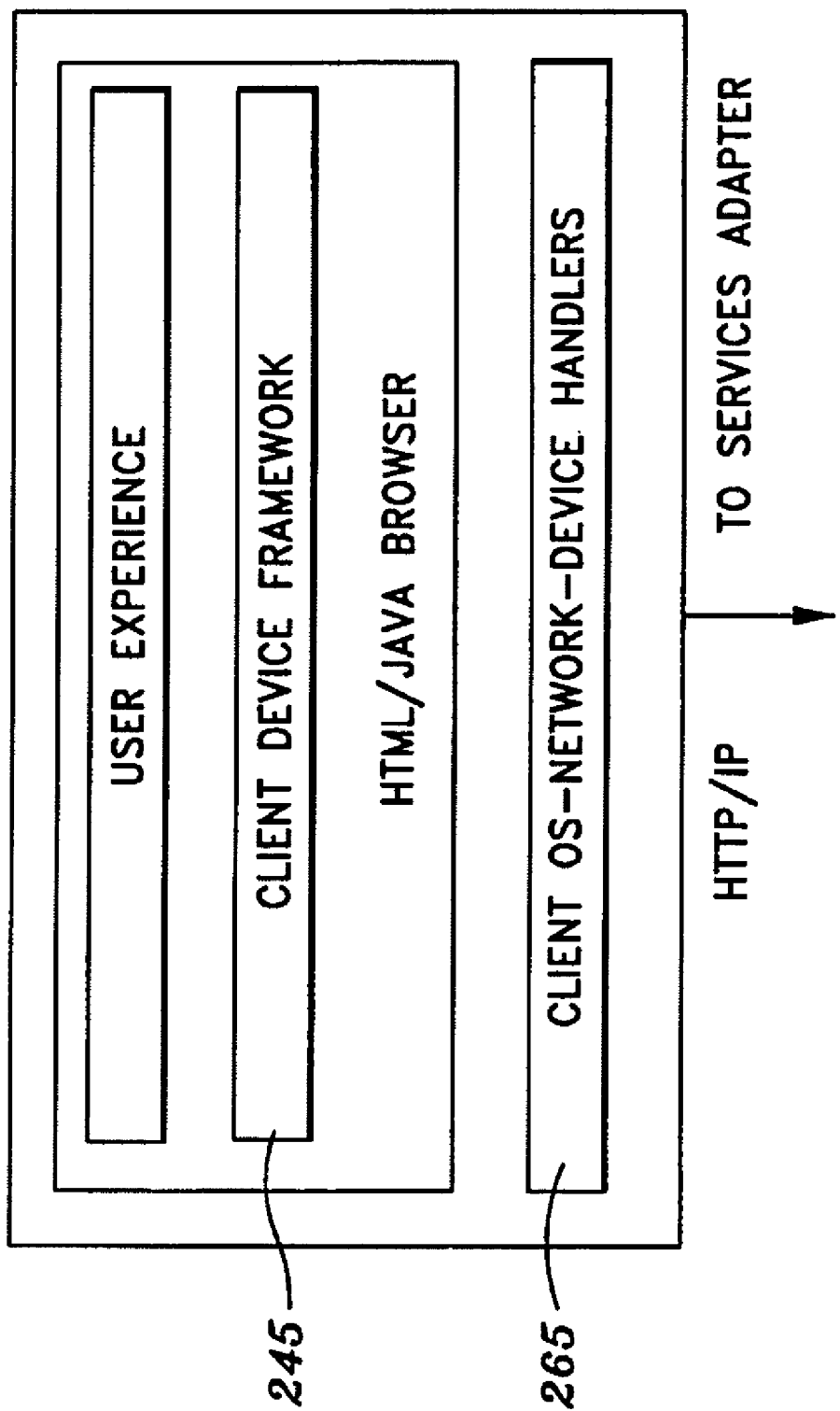

Referring now to FIG. 2C, certain additional aspects of one embodiment of client-side device 225 are depicted. In one embodiment, the processing logic module 245 is a platform-specific application framework that is downloaded to the client device 225 as part of its bootstrap or resides in non-volatile memory on the device and invoked during bootstrap. In another embodiment, the processing logic framework may be responsible for one or more of the following: i) handling client data requests and interacting with the services adapter 220; ii) handling platform-specific events such as remote and keyboard handling; iii) providing a device translation layer between device-specific functions and application services (e.g., setting device clock, getting client MAC address, etc.); and iv) formatting data appropriately for the display rendering engine 240. In one embodiment, for a client with a browser rendering engine, the process logic module 245 will construct the appropriate HTML with data retrieved from the service adapter 220. It should be noted that the nature and function of the process logic module 245 may be dependent on the client device 225 and may not exist on devices that do not require a framework. For example, on digital media receivers (DMR), the service adapter 220 may directly deliver data to a third party application module that presents the data appropriately to the user. Finally, the client-side device 225 of FIG. 2C may also include middleware and operating system 265.

Figure 3A:
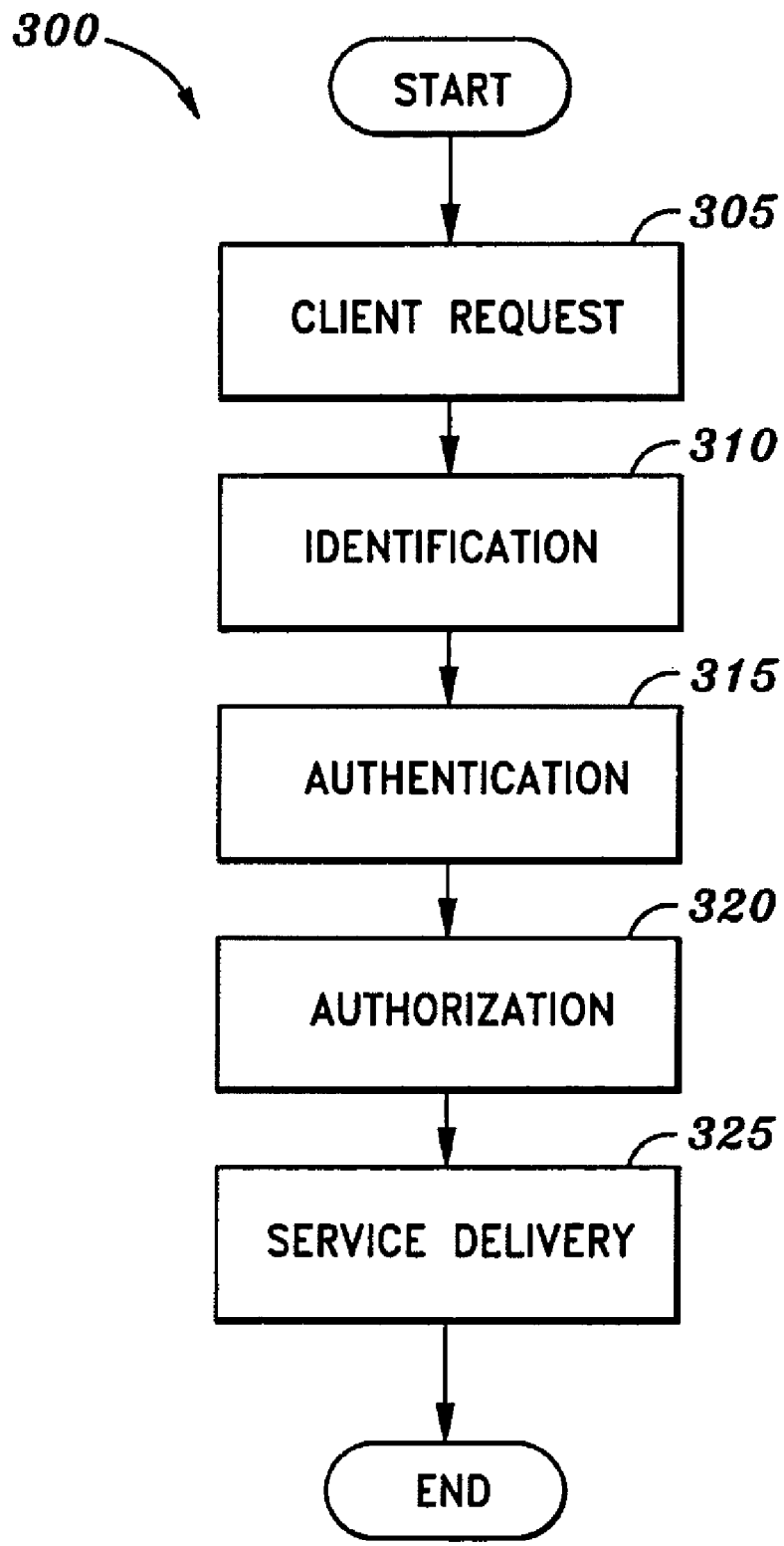
FIGS. 3A-3B are flow diagrams of how a client device request may be processed, according to one or more embodiments.

FIG. 3A depicts a simplified flow diagram for how a client device (e.g., client-side system 130) requests data and services. In the embodiment of FIG. 3A, request process 300 begins at block 305 when a client device (e.g., client-side system 130) submits a request, which in one embodiment may be submitted to back-end server 125. In another embodiment, the request made is sent to the data plane 205 via services adapter 220 as discussed above. Regardless of how the request is issued, request process 300 may then continue to block 310 where the client device is identified based on a device ID. In one embodiment, the client device may identify itself to the services adapter 220 using a unique ID string. While in one embodiment, the unique ID string is the Ethernet Media Access Control (MAC) address, it may also be a smart card address, wireless network address, CPU identifier, or simply an arbitrarily selected value.

Figure 3B:
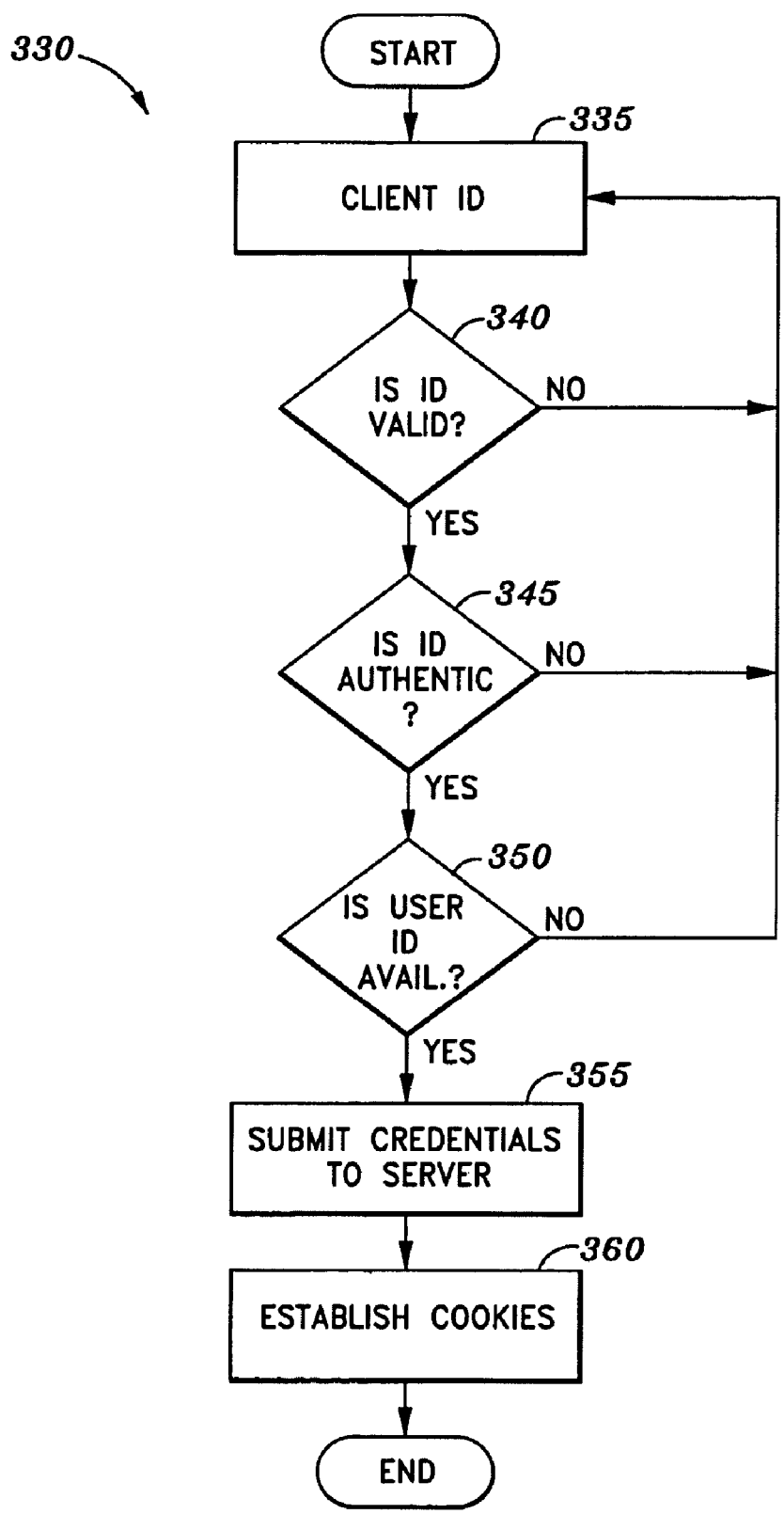

Once the client device has been identified, the client device may then be authenticated at block 315. To that end, FIG. 3B is a flow diagram of one embodiment for the authentication process 330 of a client device. After the client device ID is provided at block 335, a validity determination may then be made at block 340. This may involve, for example, a determination that the provided device ID contains a particular number of characters or fits a particular data format. Once the ID is identified as valid, authentication process 330 may then continue to block 345 where a determination of the ID's authenticity is made. In one embodiment, this may involve mapping the client device ID against existing entries of a database, such as a database stored on back-end server 125. The use of certificates, encryption, hashing, secure sockets, and so on may also be used to prevent tampering with the device authentication. At this point, devices that have been authenticated may be provided with some privileges for accessing available data and services, but not necessarily all possible privileges. It should also be appreciated that invalid or unauthenticated device IDs may be provided with yet a more reduced level (e.g., guest level) of access privileges.

Once an ID has been identified and authenticated as described above, the client device may be able to obtain additional privileges and services by allowing a user to login. To that end, process 330 continues to block 350 where a determination may be made as to whether a user ID is available. On HTML-capable client-side devices 130 where the user input device 190 is a keyboard (or a device capable of keyboard entry), user's may be presented with a username/password entry dialog box. Alternatively, on HTML-capable client-side devices 130 with only remote control support, the user can be presented with a PIN entry dialog box. Finally, where the client-side device 130 is not HTML-enabled, user ID data may be submitted by the device to the Service Adapter 220 by another suitable means (e.g., an HTTP post). The Service Adapter 220 may then perform the necessary data submission to the back-end server 125 on behalf of the client-side device 130.

When a user ID is available it may be mapped to the client device ID previously supplied. In one embodiment, this is accomplished by a backend server 125 where a record of various client device ID's is maintained against various user IDs. This may further be configurable via a backend server system and appear as a preference as described in FIG. 5F. Irrespective of the implementation, the result is a many-to-one or a many-to-many mapping between user IDs and client IDs. This information can then be used to retrieve the user ID credentials given a client ID. At block 355, the user ID credentials may then be submitted to a database (e.g., stored on back-end server 125) for server-side authentication. At this point, the authentication process may be completed at block 360 when one or more cookies (or other appropriate means of identification) may be established and used to allow the underlying data/services request to be filled. It should of course be understood that there are numerous other methods for authenticating a client device that are consistent with the principles of the invention.

Referring back to FIG. 3A, once the authentication process of block 315 is complete, request process 300 may then continue to block 320 where the user is actually authorized by the server-side system to receive/view the requested data/services. Since at this point, the type of client device involved will be known, it is possible to customize service/data offerings for a particular type of device (e.g., no streaming video available for devices which do not support that feature, etc.). Data/service delivery may then take place (block 325).

In one embodiment, the Service Adapter 220 may provide data in a stream format based on the specific client request. By way of example, one potential request may be a request for XML data, in which case data may be delivered in XML format. Where the request is for HTML data, the requested data may be delivered in HTML format and combined with the application UI and logic flow. In one embodiment, the application UI and logic may be an HTML page with data appropriately positioned within it. For example, this may be a stock quotes HTML page that renders an overlay over existing broadcast content. Similarly, custom data streams may also be delivered via the Services Adapter 220 for client-side devices that are capable of parsing data streams that are arbitrarily delimited (e.g., comma separated values, etc.). The process logic framework 245 and/or the service adapter 220 may do whatever is necessary to deliver the service to the user, based on knowledge of the capabilities of the device as derived from block 320.

Figure 4A:
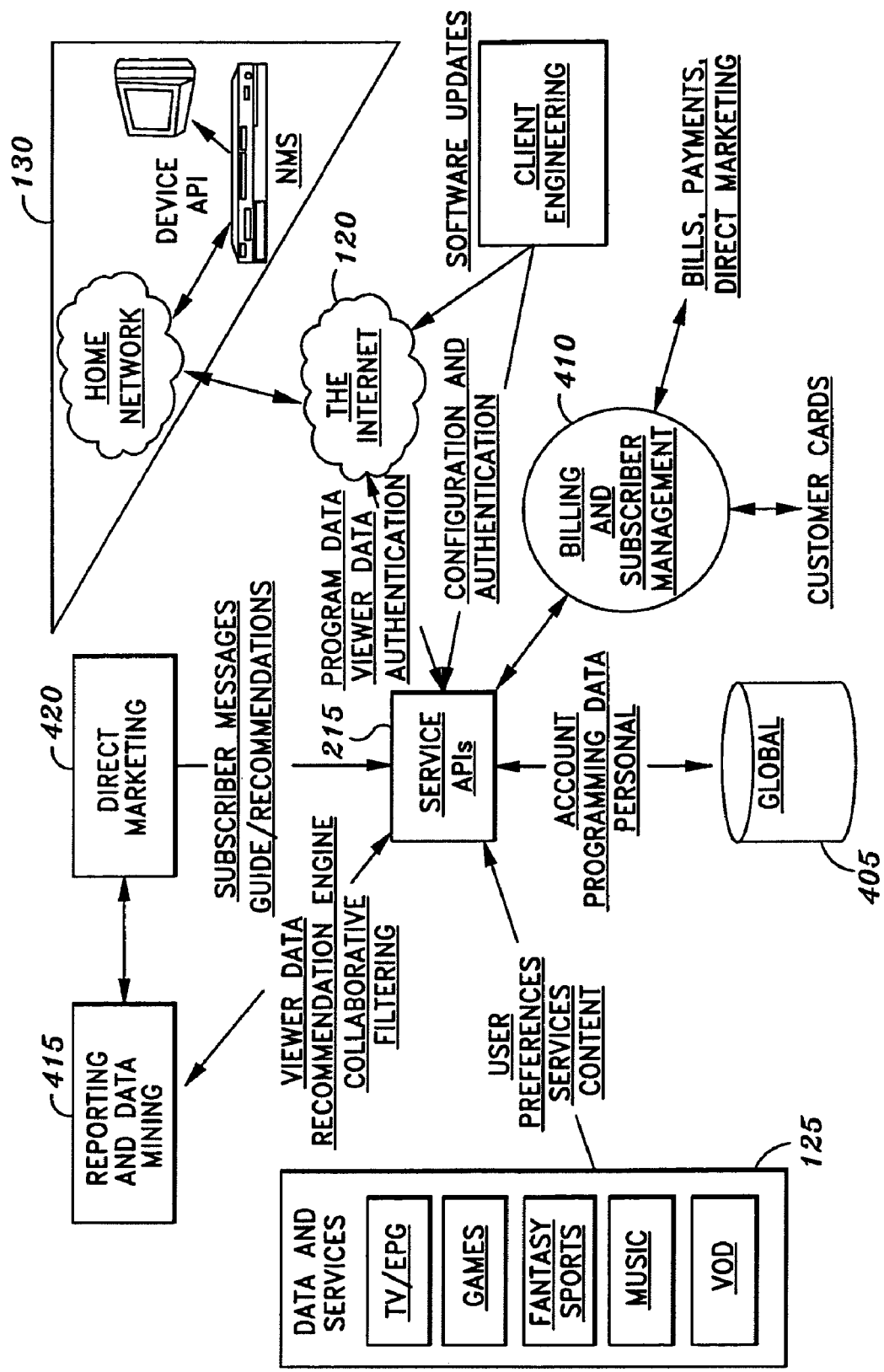
FIGS. 4A-4B depicts one or more embodiments of a system-level diagram of various aspects of the invention, showing the interconnectivity relating thereto.

Referring now to FIG. 4A, one embodiment of a system-level diagram showing the interconnectivity of various aspects of the invention is depicted. In this embodiment, Services API 215 is shown as being in communication with network 120 (i.e., the Internet), client-side system 130 and back-end server(s) 125. Additional optional back-end systems are also depicted (e.g., reporting and data mining, direct marketing, billing and subscriber management, etc.).

As shown in FIG. 4A, back-end server 125 may contain various data/services which may be requested by the client-side system 130 as detailed above in FIGS. 3A-3B. In one embodiment, such data and services may include some form of an Electronic Programming Guide (EPG), TV+, movies or video on demand, kids' programs, sports (including but not limited to fantasy sports), overlays (including but not limited to data and voice overlays), music, photos, auctions, games, personals and other items as may be appropriate for a given device. The nature and type of services delivered may be customized for that device given a prior understanding of its capabilities as identified in block 320 (see FIG. 3A). In addition to requesting data/services, the Services API 215 may be used to obtain user preferences and/or identification information from the backend server 125. In one embodiment, such data/services may include user preferences related to the data/services described above.

In one embodiment, the Services API 215 (via the Services Adapter 220—see FIG. 2A) performs the authentication functionality by mapping supplied device and user identification information against stored existing values. While in one embodiment, user/device ID information may be stored on back-end server 125 as mentioned above, it may also be stored on a separate user database 405 that may managed by a third party service provider.

As also shown in FIG. 4A, the Services API 215 may further be used to manage other user requests, such as billing and subscription inquiries (410). Similarly, the Services API 215 may be used to facilitate data mining functionality (415) and to interface client-specific advertising content for direct marketing purposes (420). It is to be appreciated that given the identity of the user (e.g., from the client device ID), the preferences and personalized services as they apply to the user on the network can now be directly applied to this same user on any device that can be identified with the user. In this fashion, a user may transfer their personalization and individualism across devices and mediums. That is, once the preferences and/or personalized services have been specified and entered as described above, the user may choose to apply his/her preferences and/or personalization to use services accessible and/or provided by or through any device that is connectible or connected to the network. Such devices may include hand-held devices, such as personal digital assistants (PDAs), telephones, personal computers, notebooks, set top boxes, digital media receivers or other connected devices. Further, all infrastructure and services that are used to provide the online experience may be applied towards their multimedia experience.

It should also be appreciated that the network 120 may be the Internet, or may also be a wide area network, a local area network or any other type of connection. In one embodiment, all that is required is that the client-side device 130 be appropriately connected to a service adapter 220 that is capable of providing a service to the device. It should further be appreciated that the above-described functionality for Services API 215 may be divided between a plurality of APIs and/or a plurality of back-end servers.

Figure 4B:
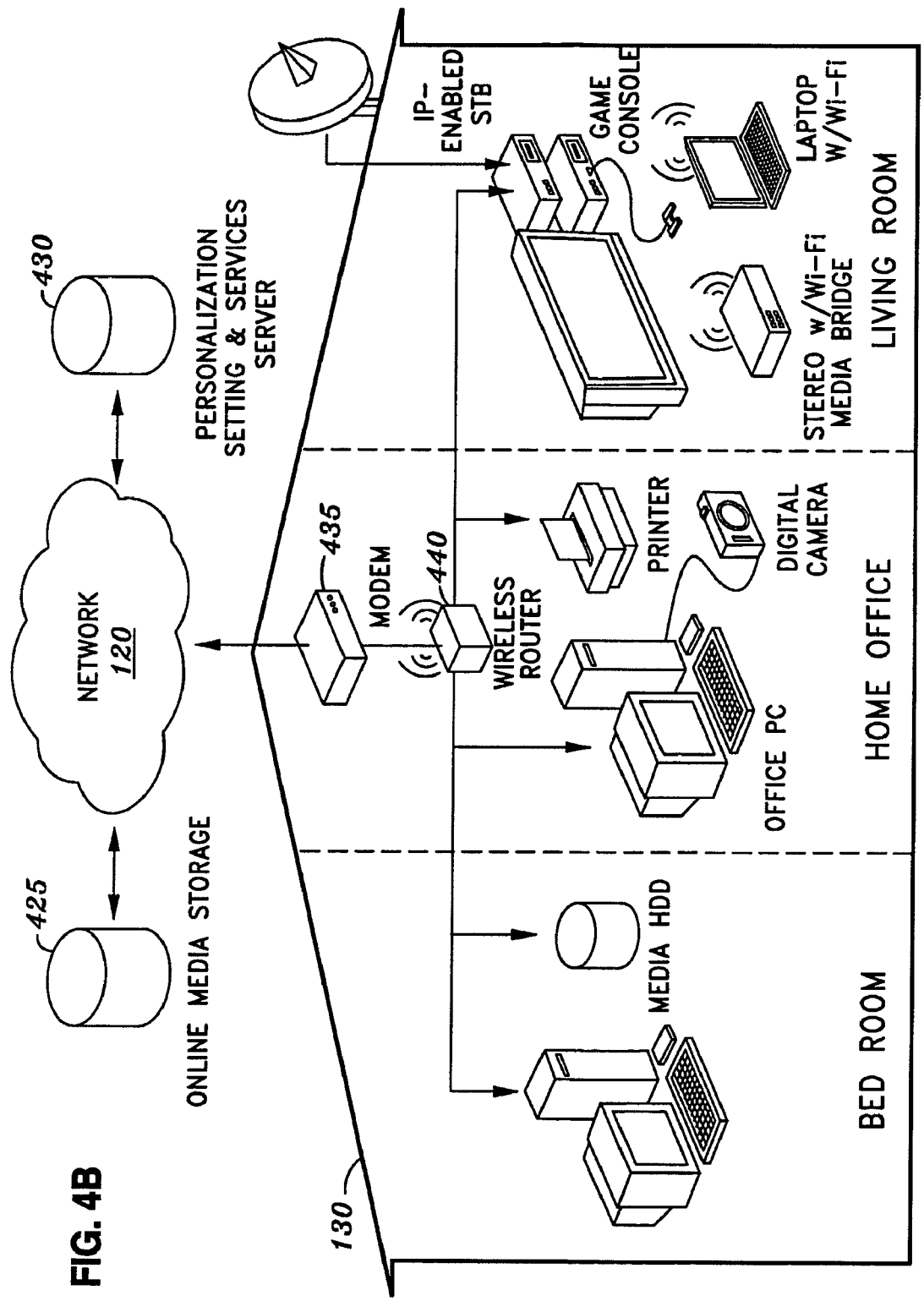

FIG. 4B is another embodiment of system-level diagram showing the interconnectivity of various aspects of the invention. In this embodiment, the functionality of back-end server 125 has been allocated between online media storage 425 and personalization settings & services server 430. With online media storage 425 and server 430 coupled to network 120, a user can access/request various data/services from a client-side system 130 (e.g., via modem 435). In this embodiment, the client-side system 130 comprises a bedroom portion, a home office portion and a living room portion. In one embodiment, a wireless router 440 may be used to interconnect the various client-side systems. It should of course be appreciated that the particular devices depicted in FIG. 4B that comprise the client-side system 130 are illustrative only, and numerous other configuration are equally consistent with the principles of the invention.

Figure 5A:
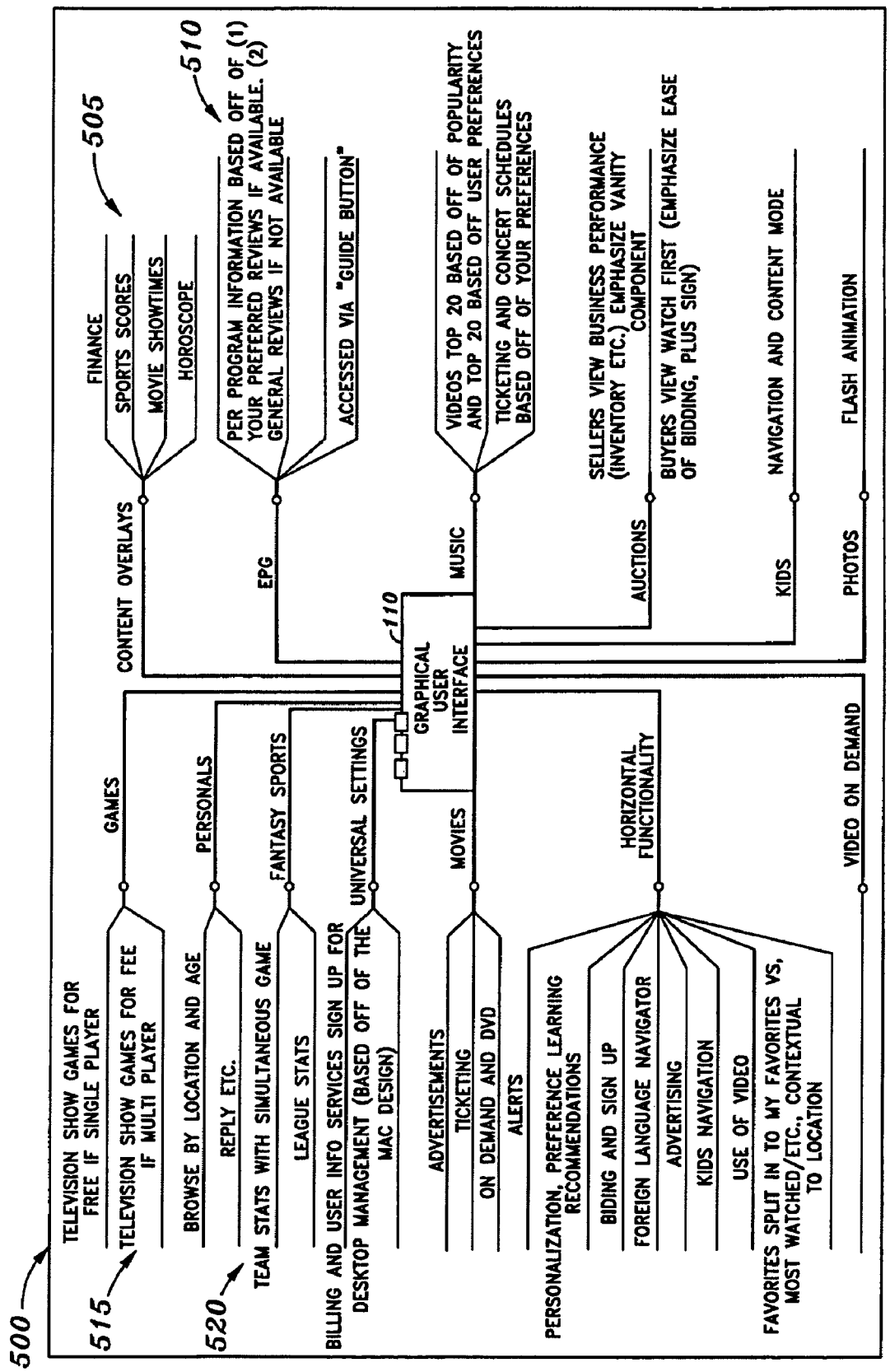
FIG. 5A is one embodiment of a diagram showing some of the functions and services that are accessible through an online user interface.

Referring now to FIG. 5A, a relational diagram 500 is depicted showing some of functions and services that may be accessible through GUI 110, which in one embodiment is a Web page. From the GUI 110 of FIG. 5A, a user may set preferences for content overlays 505, EPG settings 510, games 515, fantasy sports 520 and various other content- and services-related settings as depicted in FIG. 5A. From GUI 110, an online user can navigate the various functions and/or services to set or modify user preferences for the non-broadcast content/services accessible through client-side device 130. One embodiment of an interface usable to provide user preferences for the non-broadcast content/services is described in co-pending U.S. patent application Ser. No. 10/752739, entitled "System and Method for Providing a User Interface," filed on Jan. 6, 2004, which is assigned to the assignee of the present application, and incorporated herein by reference.

Figure 5B:
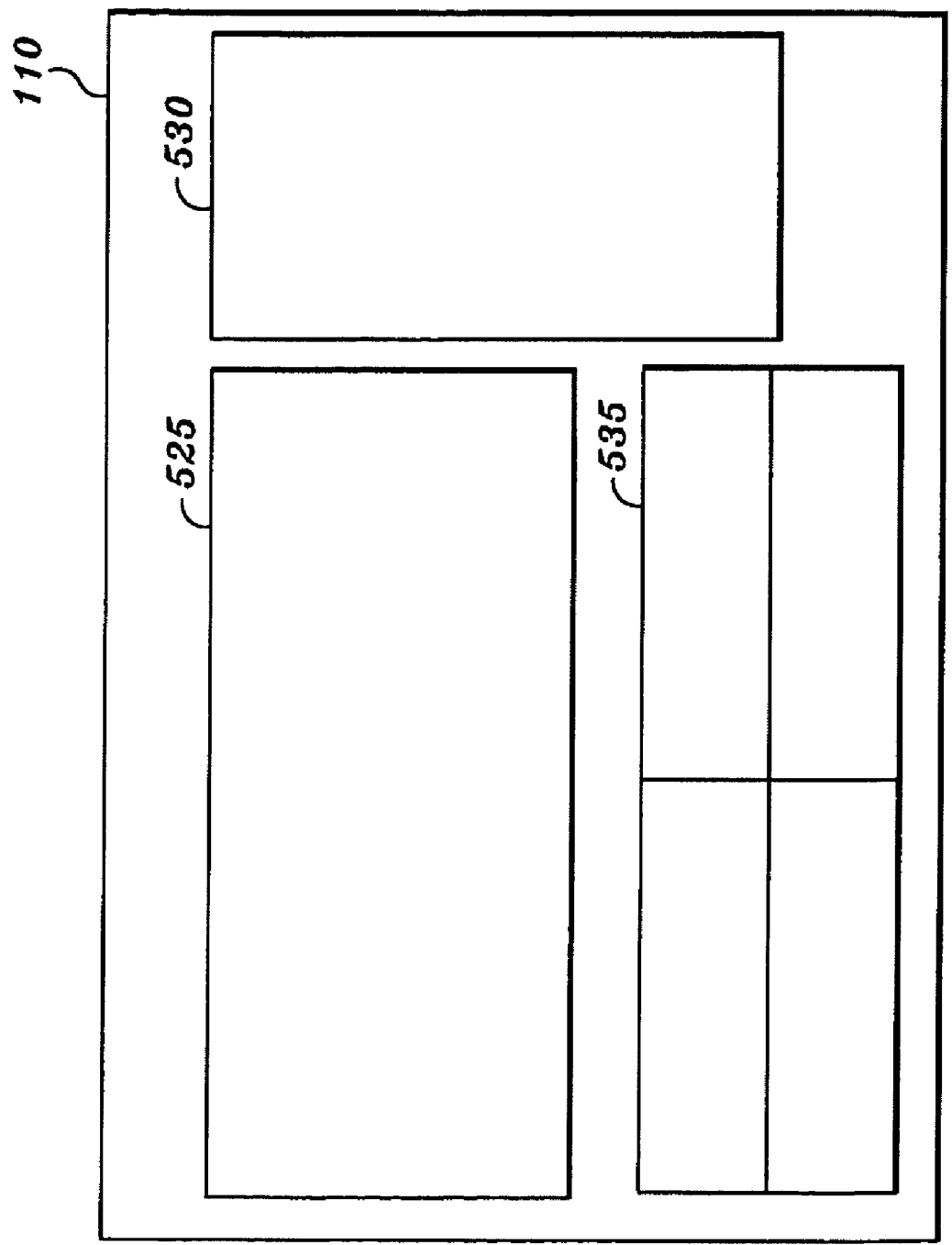
FIG. 5B is one embodiment of the online user interface of FIG. 5A.

FIG. 5B depicts one embodiment of GUI 110 that may be used to enter user preference information, browse available online features and make content selections. In this embodiment, GUI 110 includes a content display window 525, a selection menu 530 and a feature window 535. Content display window 525 may be used to display information regarding available content (e.g., music, videos, pictures, etc.), or may be used to display the content itself. Selection menu 530 may similarly be used to select among available content options, while feature window 535 may be used to display features options to a user for selection by the user.

Figure 5C:
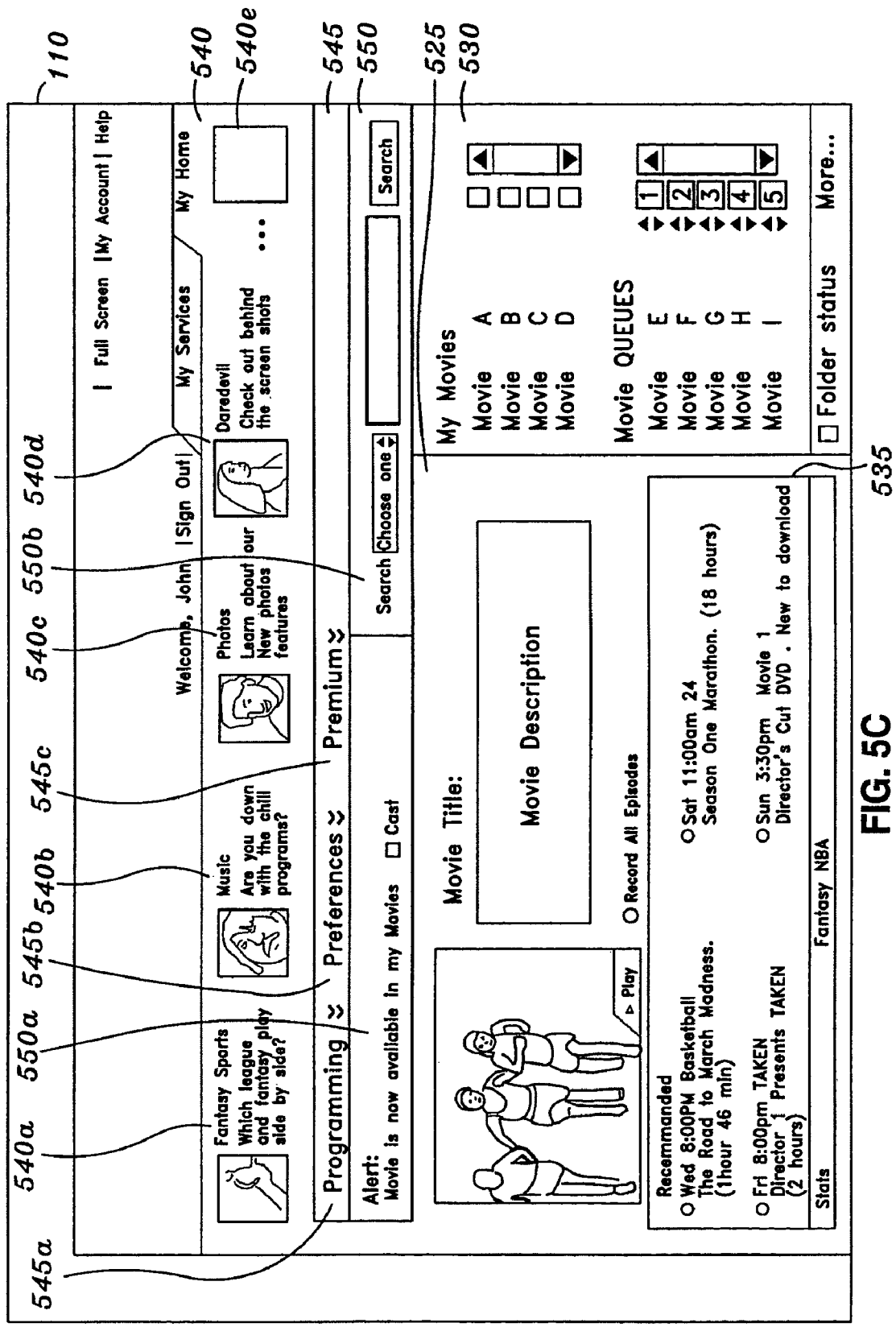
FIG. 5C illustrates another embodiment of the online user interface of FIG. 5A.

FIG. 5C illustrates another embodiment of the online user interface of FIG. 5A. The online user interface or graphical user interface 110A of FIG. 5C may be used to enter user preference information, browse available online features and make content selections. In this embodiment, GUI 110A includes a content display window 525A, a first selection menu 530A, a feature window 535A, a services/content window 540, a second selection menu 545 and a third selection menu 550. Content display window 525A may be used to display information regarding available content (e.g., music, videos, pictures, etc.), or may be used to display the content itself. First selection menu 530A may similarly be used to select among available content options, while feature window 535A may be used to display features options to a user for selection by the user. Services/content window 540 may be used to display various services or content available for selection, such as Fantasy Sports 540a, music 540b, photos 540c, movies 540d, or other services 540e. The second selection menu 550 facilitates selection of programming features 545a, user preferences 545b or premium features or services 545c. Additional features may of course be provided for selection. The third selection menu 550 may be used to provide prompts or alerts, such as an indication that a movie is not available for selection under the movies menu 530A. The third selection menu 550 may also include a window for conducting searches 550b.

FIG. 5D illustrates one embodiment of the Electronic Programming Guide provided through the use of the online user interface of FIG. 5C. Upon selection of the programming feature 545a, a scheduled selection window 560a may be displayed on the GUI 110. The scheduled selection window 560a comprises recording window 560a illustrates the movies or programs that have been selected for recording, along with the dates and times (start times and length of program) for recording. The window 560a also includes a calendar 560b and a programming guide 560c of the shows or movies available for recording. The user may select a move or program for recording using an input device (e.g., by selecting a key on a remote) and view his selections on the menu 570 as shown in FIG. 5E and described below.

FIG. 5E illustrates one embodiment of the Schedule Recordings provided through the use of the online user interface of FIG. 5C. The user may organize his or her selections for recording by viewing selection menu 570 as shown in FIG. 5E. The user may select programs or movies (along with the corresponding size and media type of the selection) displayed on the menu 570 to delete the corresponding movie or program.

FIG. 5F illustrates one embodiment of the Preferences menu provided in accordance with the online user interface of FIG. 5C. Upon selecting the preferences window 545b on GUI 110, a preference menu 575 is displayed on the GUI 110. The preference menu 575 may include one or more preference menu sections 575a-575j for selecting or entering user preferences. In one embodiment, the preference menu sections 575a-575j comprise a General section 575a, a Parental Controls section 575b, a Channel Guide section 575c, a Movies/Video on Demand (VOD) section 575d, an Overlays section 575e, a Photos section 575f, an Auctions section 575g, a Games section 575h, a Personals section 575i, and other miscellaneous sections 575j.

Each of the preference menu sections 575a-575j may comprise one or more options for selecting preferences. These options may provide predetermined options which the user may scroll through and select. Alternatively, the user may specify his or her own preference(s). In the embodiment shown in FIG. 5F, the user is presented with a variety of predetermined options, which may be selected to enhance his or her viewing experience.

In the embodiment of FIG. 5F, the General section 575a may include options for enabling or disabling use by multiple users of any of the services or programs by selecting boxes 575a-1 or 575a-2 respectively. The user may also enable or disable the sending of automatic updates 575a-3. In this embodiment, the user may use an input device, such as a mouse, to click on the windows provided in section 575a to select his/her options.

Similarly, the user may make various selections under the Parental Controls section 575b. For example, the user may enable Timed Blockout and/or enable Channel Blockout through the selection of boxes 575b-1 and/or 575b-2 respectively. If selected, the user may specify the time period to block out and/or the channels to block out the time and/or channel through the use of selection box 575b-3 and/or 575b-4. In one embodiment, the user may scroll through the time periods and/or channels in the selection box 575b-3 and/or 575b-4 by clicking on the up or down arrow(s) provided to the side of each selection box 575b-3 and/or 575b-4.

Likewise, the user may enter his/her channel preferences by entering selections in the Channel Guide section 575c. In this embodiment, the user may add channels to his/her list of favorite channels, selecting the viewing period, remove channels from his/her list of favorite channels and/or select the ratings for viewing. This may be accomplished through the use of selection boxes 575c-1, 575c-2, 575c-3 and/or 575c-4 respectively. As described earlier, the user may scroll through the selection boxes 575c-1, 575c-2, 575c-3 and/or 575c-4 by clicking on the up or down arrow(s) provided on the side of each selection box 575*c*-1, 575*c*-2, 575*c*-3 and/or 575*c*-4.

Movies and/or Videos on Demand (VOD) may also be selected using preference selection section 575*d*. The user may select, add or remove movies or videos by entering selections available in boxes 575*d*-1, 575*d*-2 and/or 575*d*-3. As before, the user may scroll through the selection boxes 575*d*-1, 575*d*-2 and/or 575*d*-3 by clicking on the up or down arrow(s) provided on the side of each selection box 575*d*-1, 575*d*-2 and/or 575*d*-3.

Overlays may also be added for viewing by the user. In preference selection section 575*e*, the user may choose from a list of overlays, such as weather information, financial tickers, horoscopes, etc. provided in selection box 575*e*-1. Current overlays are displayed in box 575*e*-2, where the user can parse through a list a overlays that have been selected for viewing. When viewing the display screen, the user may activate this feature through the use of an input device such as a remote controller or through selection of a button or key on the front panel of the display device.

Photos may likewise be selected for viewing, as shown in preference selection box 575*f*. The user may select a specific photo or group of photos, or other pictures, images, data, information, graphics or content, for viewing.

The user may participate in auctions. To do so, he or she may select to participate by selecting options available in the selection box 575*g*-1 under the preference selection section 575*g*. The options available may be "none", an auction site or other auction options.

Games are also available to the user. By reviewing and selecting the options available under preference selection box 575*h*, the user may select to one or more games for playing, through selection box 575*h*-1. The user may also delete previously selected games by parsing through and selecting games listed in selection box 575*h*-2. The user may also select to participate in Personals, as shown in preference selection box 575*i*. To do so, the user may select options available in selection box 575*i*-1. Other preferences may similarly be provided to the user through selection section 575*j*, to enhance the user's experience. It is understood that one or more of the above selection sections may be implemented. In addition, a greater number of selection sections may also be implemented.

Figure 6A:
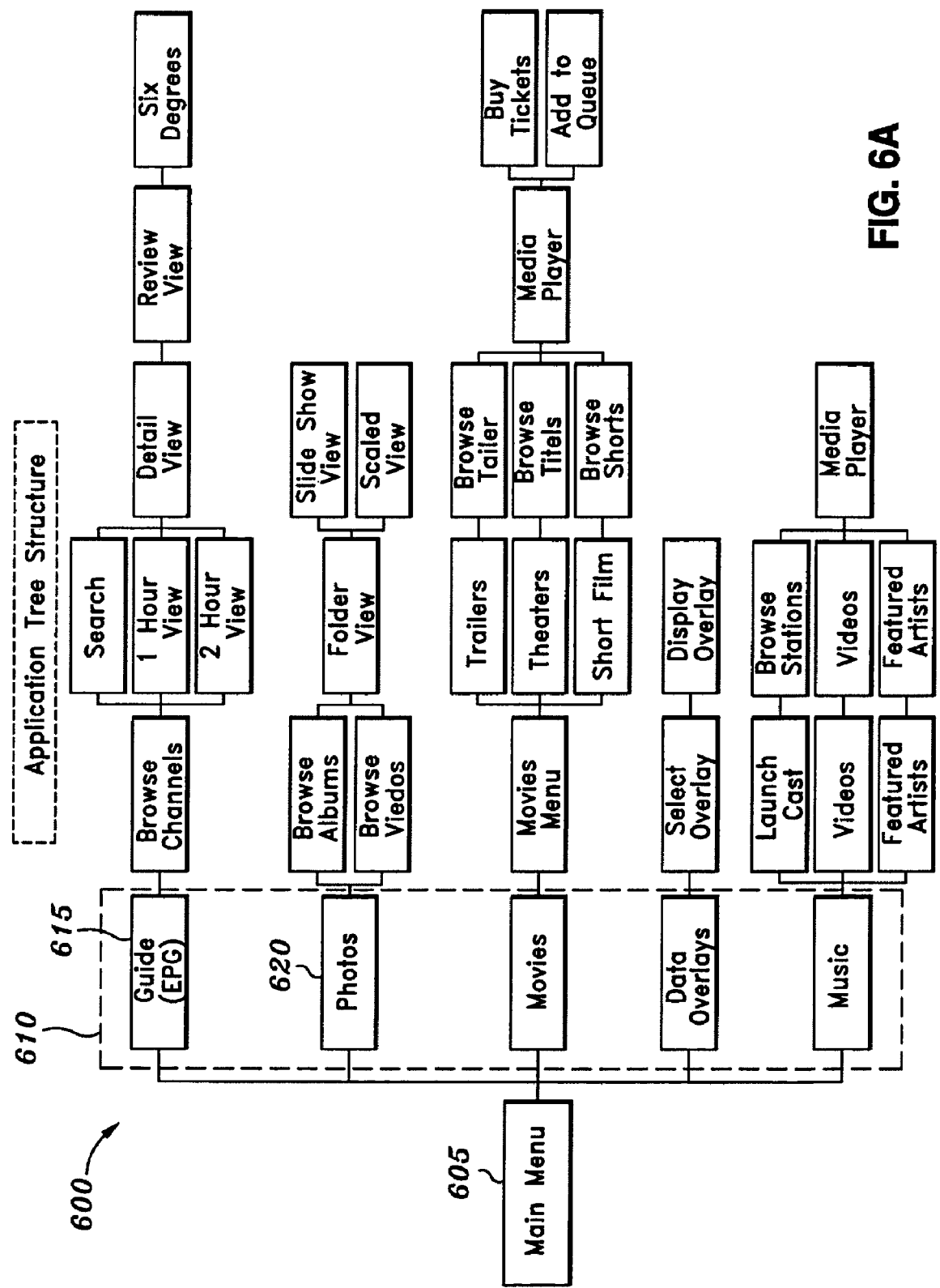
FIG. 6A is one embodiment of a diagram showing an application tree structure that may implement one or more aspects of the present invention.

Once preferences have been determined, the user may access functions/data/services via a client-side device 130. Referring now to FIG. 6A, depicted is one embodiment of an application tree structure 600 for the functions/data/services that may be accessible to a user via a client-side device 130. As shown in FIG. 6A, main menu 605 will contain various selection options for a user to be able to access available data/services, including but not necessarily limited to non-broadcast data. In the embodiment of FIG. 6A, these selection options are the first set of sub-level menus 610, which includes a Guide, such as an Electronic Programming Guide (EPG), TV+, Movies/VOD, Kids programs, Sports (such as Fantasy Sports), Overlays (such as Data Overlays), Music, Photos, Auctions, Games, Personals, and Miscellaneous menus. For example, by selecting to view the EPG sub-level menu 610-*a*, users may browse channels and search for particular broadcast programming using the lower-level menus. Similarly, by selecting the TV+ sub-level menu 610-*b*, users may select to watch various outtakes on television programs; by selecting sub-level menu 610-*c*, users may select to watch movies and VODs; by selecting sub-level menu 610-*d*, users may select to watch Kids' programs; by selecting sub-level menu 610-*e*, users may select to view and/or participate in various sports programs, for example, fantasy sports. In addition, by selecting the Overlays sub-level menu 610-*f*, users may view various overlays, such as financial information, weather information, horoscope, etc.; by selecting the Music sub-level menu 610-*g*, users may view and/or listen to music; by selecting the photo sub-level menu 620 from the main menu 605 a user may browse their photo albums, videos, etc.; by selecting any of the Auctions, Games and/or Personals sub-level menus 610-*i*, 610-*j* and 610-*k*, the user may: participate in one or more auctions, play games or view/participate in personals, respectively. The application tree structure 600 of FIG. 6A is but one embodiment of how a user may navigate through the various available data/services on a client-side device 130. For example, one embodiment of how a user may navigate the application tree structure 600 or corresponding display screens is described in co-pending U.S. patent application Ser. No. 10/752762, entitled "System and Method for Navigation of a Multimedia Interface," filed on Jan. 6, 2004, which is assigned to the assignee of the present application, and incorporated herein by reference. Moreover, it should further be appreciated that additional functions/data/services may accessible using application tree structure 600, such as the embodiment of searching for content described in co-pending U.S. patent application Ser. No. 10/752823, entitled "System and Method for Searching Content Using a Multimedia Interface," filed on Jan. 6, 2004, which is assigned to the assignee of the present application, and incorporated herein by reference.

Figure 6B:
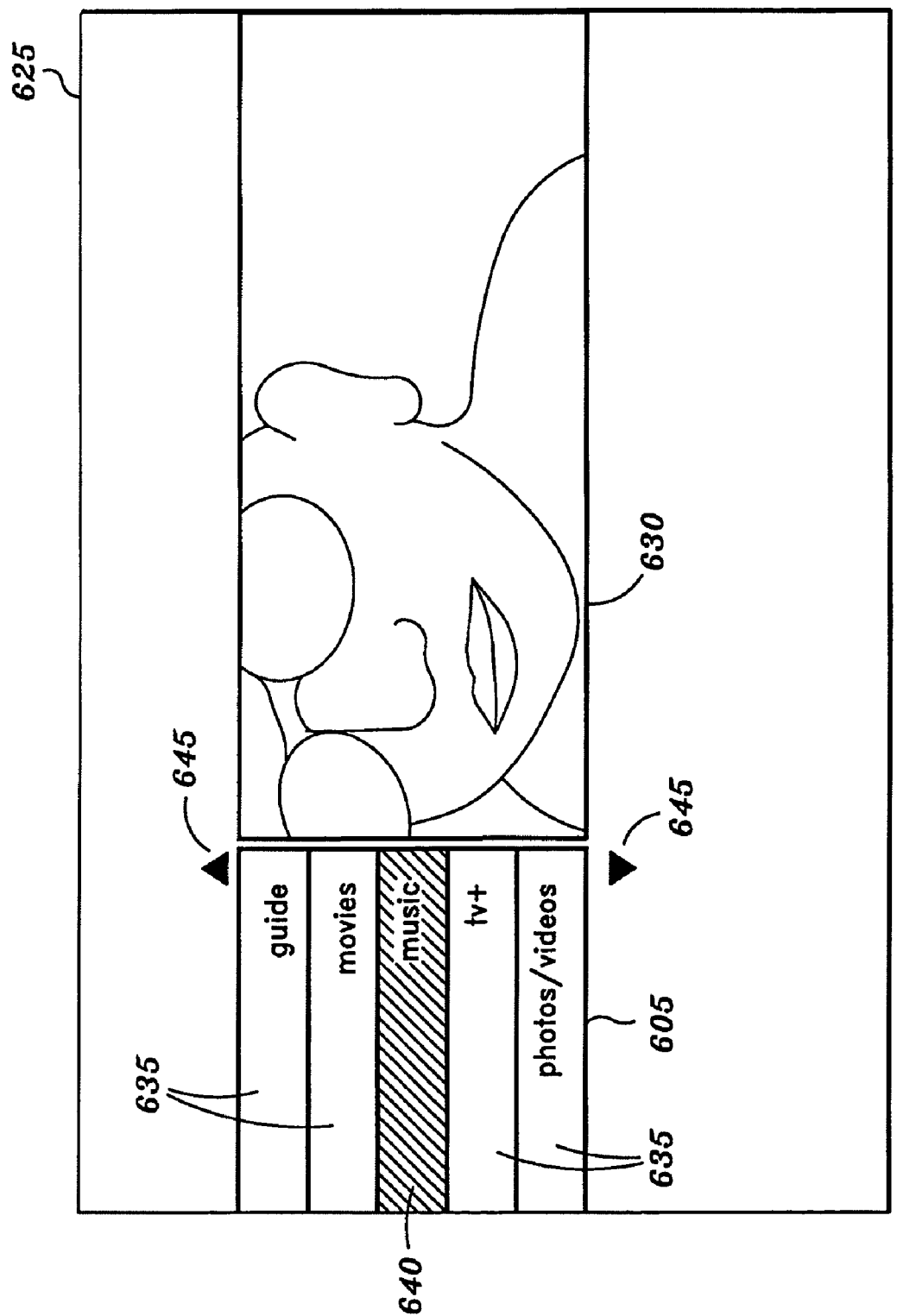
FIG. 6B-6D depict one or more embodiments of display screens for display on a broadcast-based system with which a user may interact.

FIG. 6B depicts one embodiment of how main menu 605 may be presented to a user. In this embodiment, display screen 625 is displayed on some display, such as display screen 170 of FIGS. 1A & 1C or the display device 180 of FIG. 1B. In the embodiment of FIG. 6B, display screen 625 includes an optional graphic portion 630 as well as the main menu 605. One embodiment of how display screen may be customized is described in co-pending U.S. patent application Ser. No. 10/752824, entitled "System and Method for Customizing a Multimedia Interface," filed on Jan. 6, 2004, which is assigned to the assignee of the present application, and incorporated herein by reference. As mentioned above, a user may use main menu 605 to select from a menu of available data/services (e.g., guide, movies, music, etc.). In one embodiment, user input device 190 may be used to highlight a particular menu entry for selection. In particular, a user may scroll through unselected menu options 635 to highlight a selected menu option 640. When the number of menu selection options is greater than a predetermined number of displayable options (which is five in the embodiment of FIG. 6B), a user may scroll through additional options using scroll buttons 645. Depending on the nature of the user input device 190, this may be accomplished by using the directional arrows of a remote control, or the directional keys on a keyboard. Similarly, once a desired option has been highlighted, a user may select the highlighted option using an enter key on a keyboard, a selection button on a remote or any other number of input options.

Figure 6C:
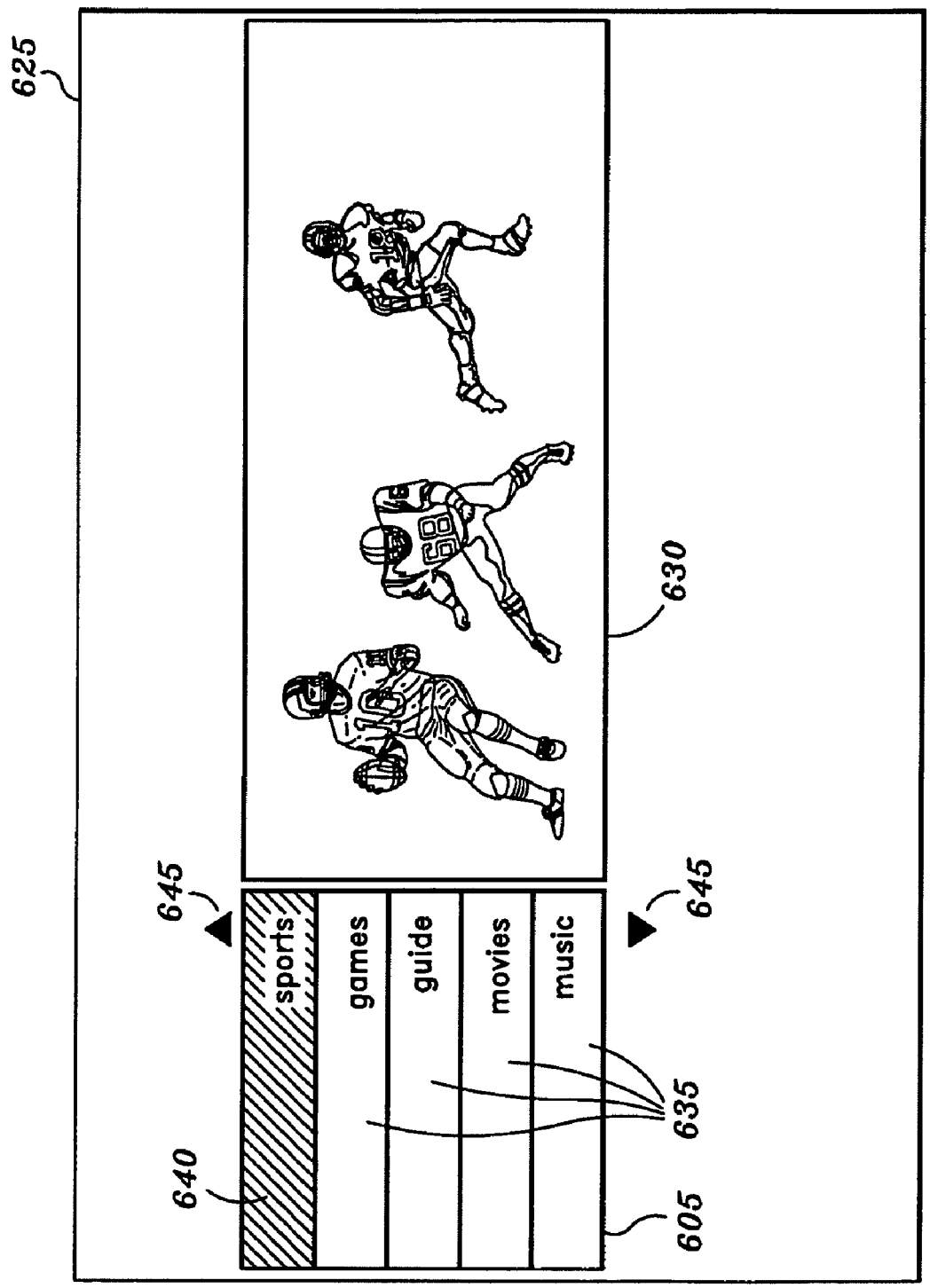
Figure 6D:
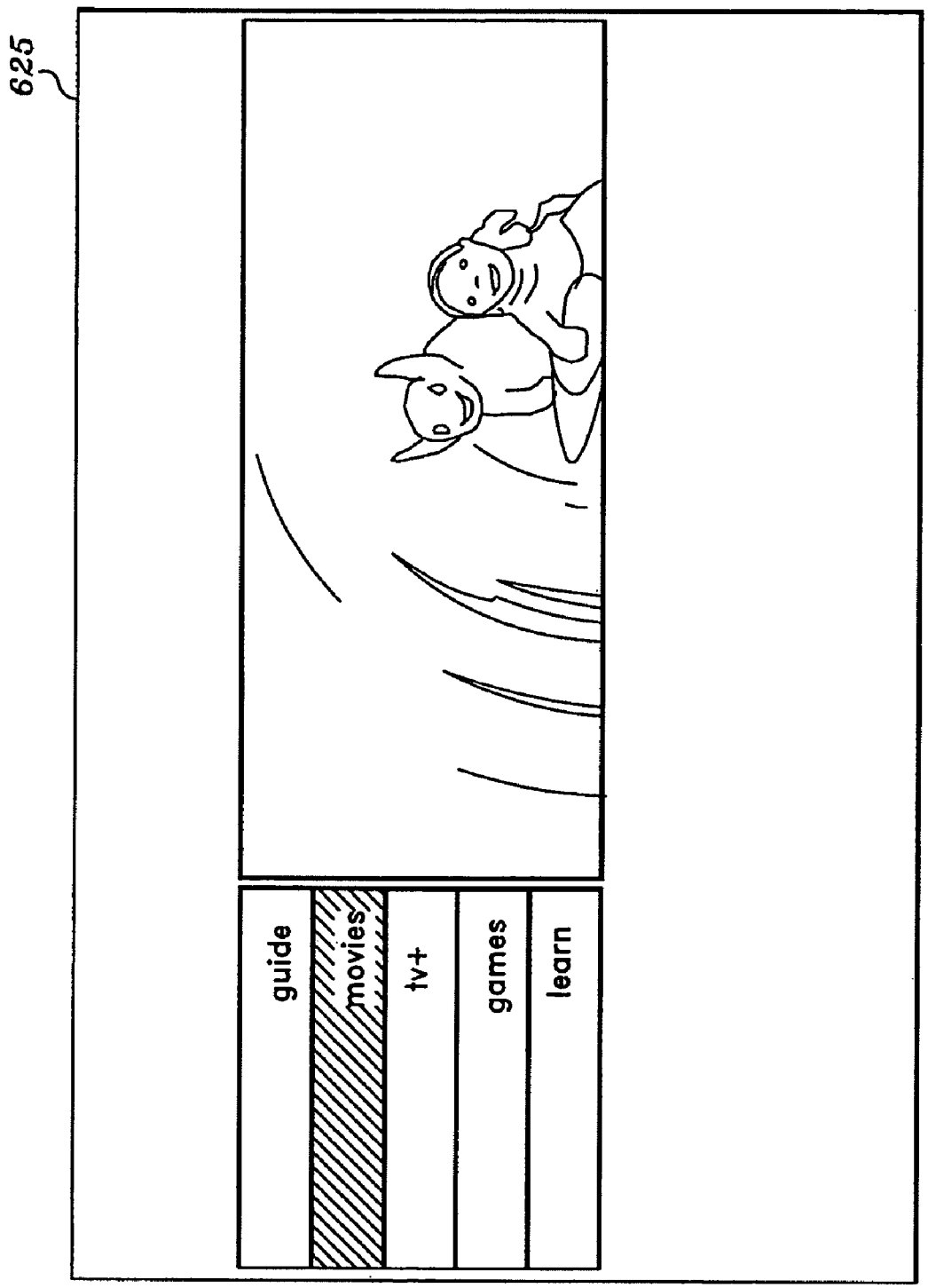

In the embodiment of FIG. 6C, a user has used scroll buttons 645 to scroll the selection menu up and highlighted what is now selected menu option 640. It should be appreciated that the menu selection options shown in FIG. 6A are exemplary options only.

Figure 7:
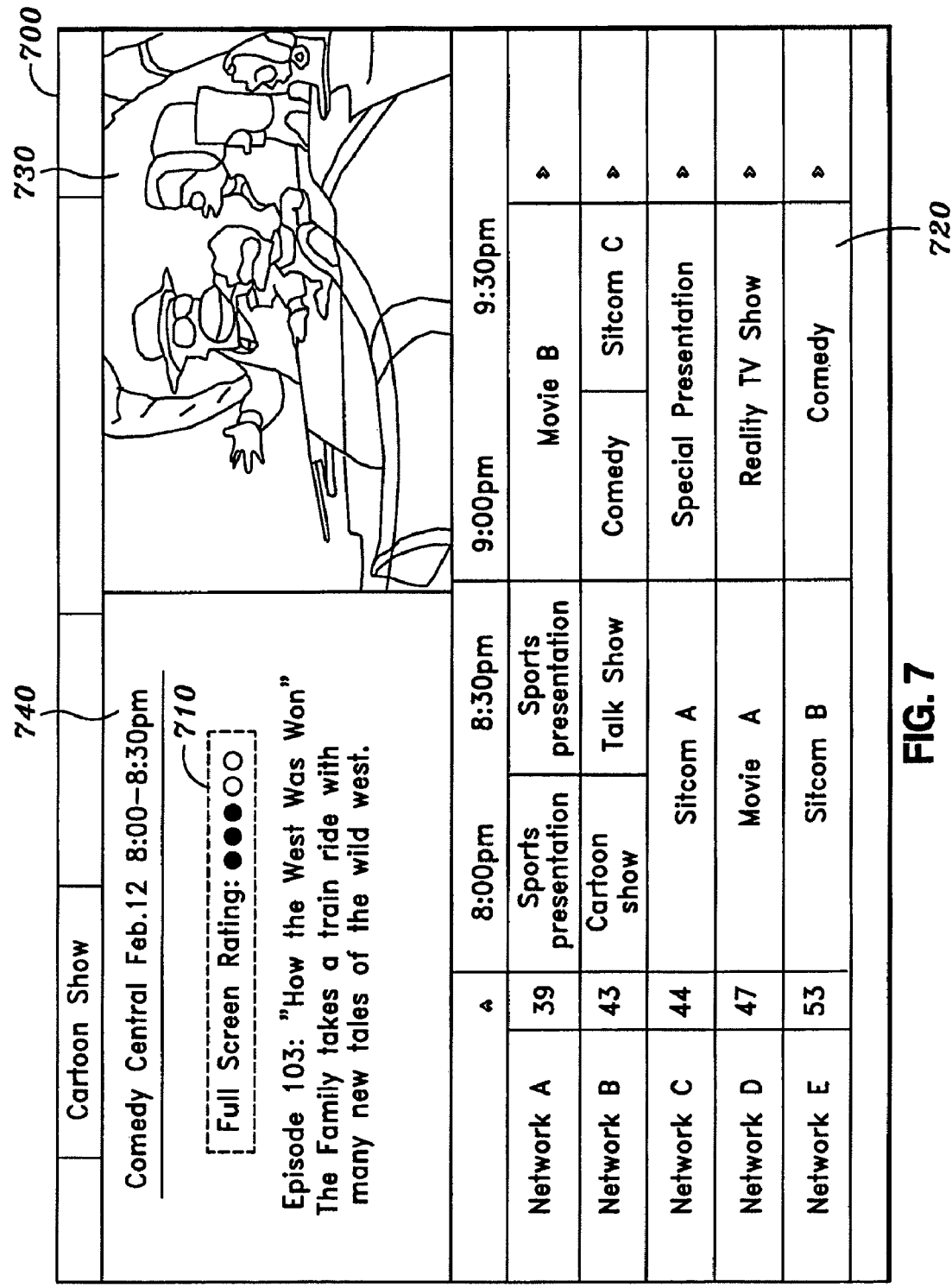
FIG. 7 depicts one embodiment of a program guide screenshot which implements one or more aspects of the invention.

FIG. 7 depicts one embodiment of a program guide screenshot 700 which may be presented to a user who has selected the 'guide' option from main menu 605. In this embodiment, a user may receive movie programming/recommendation functionality on a broadcast display device (e.g., TV) based on online movie information. Rating information 710 that is based on non-broadcast content/data 115 may be displayed to a user simultaneously with electronic programming guide (EPG) information 720, along with broadcast content 730.

Continuing to refer to FIG. 7, in one embodiment EPG 720 may be designed to allow users to navigate the programming schedule and select programs for viewing and recording. A list of networks and their associated channel numbers may be displayed, as well as some predetermined period of programming time (e.g., one hour, two hours, etc.). Users may navigate the EPG 720 using the arrow keys on a user input device 190 (e.g., a remote control) to highlight a program. As they highlight programs, related information may be displayed for each program including: name, description, network, date, run time, original air date and the show's rating information 710. It should be appreciated that the rating information 710 can refer to a critic rating or ratings by other consumers. Moreover, a user may be able to choose from a variety of rating options using the client-side device, or online using GUI 110.

The EPG 720 may also be community-based. Such community-based activity may involve live or recorded programs. For example, the user may select or identify certain programs and share their interest with the community. Such programs may be viewed live. Alternatively, if programs are selected to be recorded on a DVR, or if programs are selected to be saved on the DVR, then one's list of programs may be shared with a selected community. This may be accomplished without using an instant messenger platform or using the instant messenger buddy list. Thus, this enables one to share one's interests with a community (such as people who have the same interests).

Purchase Transactions

As discussed above, one aspect of the invention is to enable a user to perform purchase transactions utilizing a broadcast-based device, such as a television. In one embodiment, a user sets various purchase preferences using an online GUI. These purchase preferences may include method of payment, product preference information, product delivery information, etc. Based on these settings, non-broadcast content relating to product purchase information is tailored and provided to a client-side device, such as a television. For example, in one embodiment previously-discussed GUI 110 may be used to login to a user account and define various product purchase preferences and options. This information may then be provided to client-side device 130 (using Services API 215 for example), along with broadcast content 140.

Referring back to FIG. 4A, back-end server 125 may contain content, as well as information relating to available products, which may be requested by the client-side system 130 as detailed above in FIGS. 3A-3B. In addition to requesting the content/information, the Services API 215 may be used to tailor available purchase options based on user preferences and/or identification information from the back-end server 125. In one embodiment, the Services API 215 (via the Services Adapter 220—see FIG. 2A) performs the authentication functionality by mapping supplied device and user identification information against stored existing values. This authentication process may then enable a user to securely engage in product purchase transactions via client-side device 130. Services API 215 may further be used to manage other purchase-related functions, such as billing and subscription inquiries (410), data mining functionality (415) and providing client-specific advertising content for direct marketing purposes (420). In another embodiment, the Services API will be used to interface with a third-party e-commerce application for the purposes of managing and processing the client transaction.

Continuing to refer back to FIG. 4A, yet another aspect of the invention is to present product purchase options that are based on predetermined criteria, such as the category of content being viewed downloaded/recorded, previous content the user has viewed/downloaded/recorded, online content search queries, most popular product purchases, etc. To this end, data mining functionality (415) and direct marketing (420) functionality may enable tailored purchase options to be presented to a user. In one embodiment, a user's viewing and searching history may be used to establish a user profile. This user profile may then be used to tailor specific purchase options to be presented to a user. In one embodiment, backend server 125 or database 405 may be used to store such user profile information.

Figure 8A:
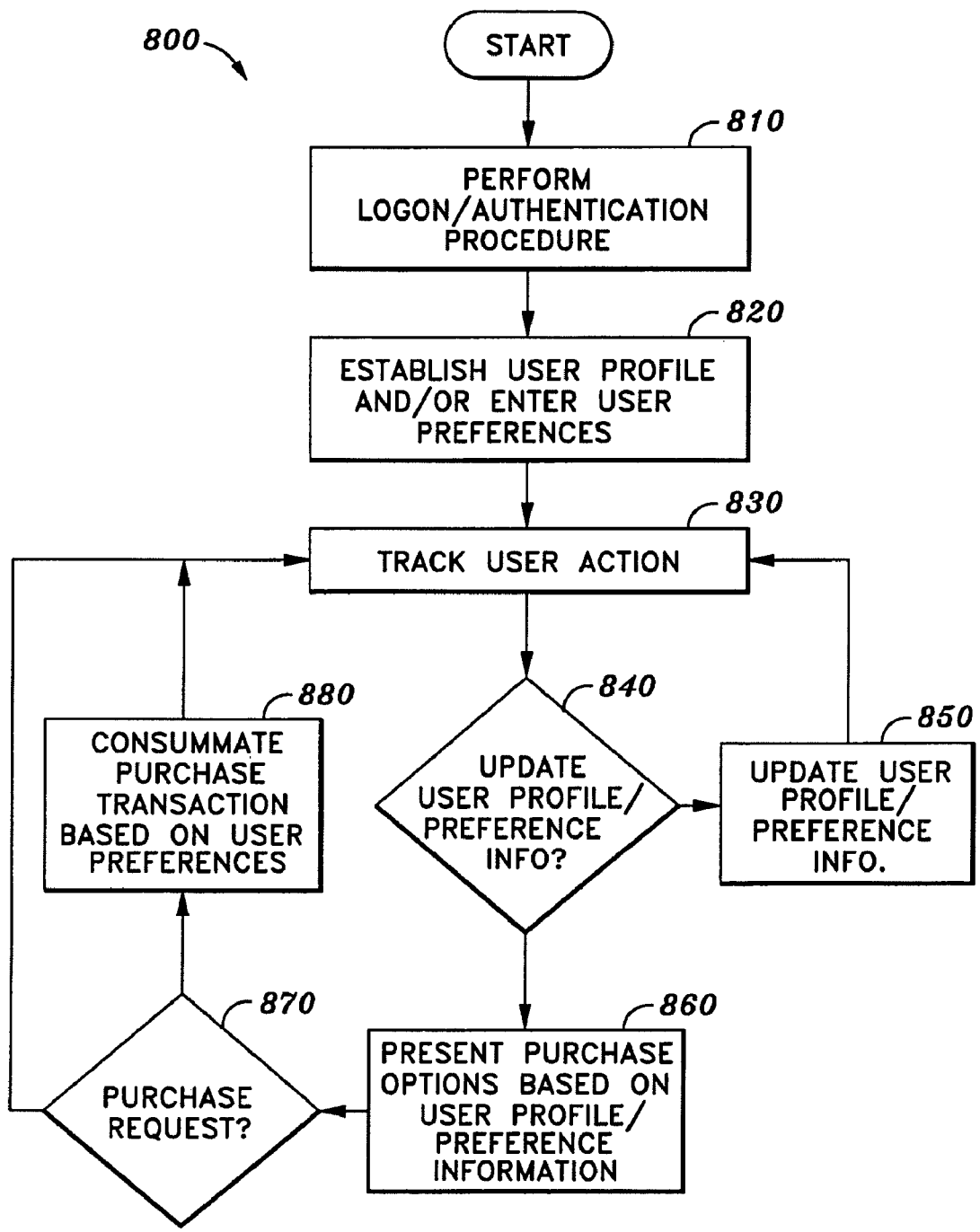
FIGS. 8A-8B depict flow diagrams of a process for carrying out a purchase transaction consistent with the principles of the invention.

Referring now to FIG. 8A, depicted is process 800 for carrying out a purchase transaction according to the principles of the invention. Process 800 begins with the performance of a logon/authentication procedure at block 810. Where a user is accessing an online user account, the logon/authentication procedure of block 810 may be performed online via a GUI (e.g., GUI 100) by supplying a simple password and/or username. Alternatively, where a user is logging on using a client-side device, the logon procedure of block 810 may be as set forth above in FIGS. 3A-3B. It should however be appreciated that numerous other logon procedures that effectively identify a particular user/client device similarly may be employed.

Once the logon/authentication procedure of block 810 is performed, process 800 moves to block 820 where a user profile may be established or user preference information entered. In one embodiment, a user profile may be established using manually entered information by the user (either online or via a client-side device). In another embodiment, rather than establishing a distinct user profile, purchase preference information may be entered by the user either online or via a client-side device. In yet another embodiment of this invention, given the identification of the client device, the particular user or account can be identified automatically for the particular transaction without any need for user input. It should further be appreciated that the user profile/preference information may be static or may be updatable.

Continuing to refer to FIG. 8A, process 800 may further include the tracking of user activities at block 830. This may be the case where, for example, the user profile/preference information is updatable. The user activities to be monitored may include online website viewing, online keyword searching, broadcast content viewing, broadcast content searching, etc. It should further be appreciated that, in addition to tracking content accessed/searched by a user, other user activities similarly may be tracked, including time of day the accessing/searching occurred or the length of time of the accessing/searching. In one embodiment, this tracking functionality may be provided by software executing on backend server 125.

Based on the user activities tracked at block 830, process 800 then moves to decision block 840 to determine if the user profile/preference information should be updated. In one embodiment, this determination is based on the user activities tracked at block 830. If a determination is made that the user profile/preference information should be updated (e.g., new user activity has occurred), then process 800 moves to block 850 to update the user profile/preference information. If, on the other hand, a determination is made that the user profile/ preference information does not need to be updated (e.g., no new user activity has occurred), then process 800 moves to block 860.

At block 860, purchase options may be presented to the user based on the current user profile/preference information. In one embodiment, such purchase options are provided as non-broadcast content 115 to client-side device 130. It should be appreciated that numerous criteria for tailoring purchase options based on user profile/preference information may be used. By way of providing a non-limiting example, Services API 215 may be used to access related content from backend server 125 and present a selection menu of purchase options to the user. While in one embodiment a user may be presented with purchase options relating to content available for downloading/recording, in another embodiment the purchase options may be product-based (e.g., DVDs, CDs, movie tickets, concert tickets, etc.). It should be appreciated that the purchase options presented to the user may be determined in any number of ways and may be for any and all types of purchasable products, tangible or otherwise.

Once the purchase options have been presented to the user, process 800 proceeds to block 870 where a determination is made as to whether the user has requested a purchase transaction. If not, process 800 reverts back to tracking user activities at block 830. If a user has issued a purchase transaction request, then process 800 continues to block 880 where the purchase request is processed.

In one embodiment, the purchase request may be processed using previously provided user preferences for payment method, delivery method and so forth. Since the user is logged on and/or authenticated (block 810), security is maintained through the purchase process. For example, once a user had indicated the desire to purchase a product, whether it is downloadable content or a tangible item, Services API 215 may be used to access a user's account and payment preferences.

Figure 8B:
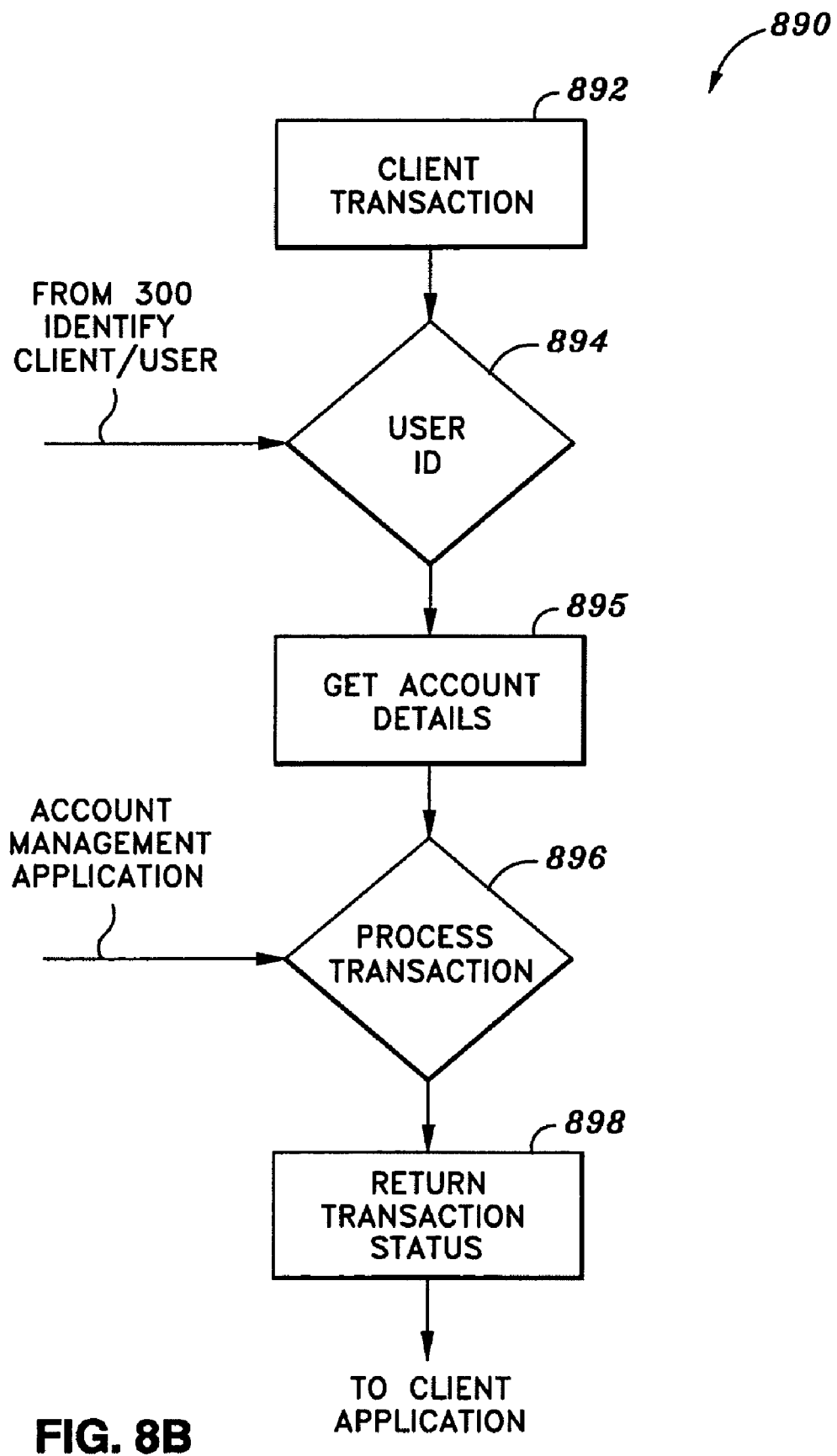

FIG. 8B illustrates one embodiment of a Purchase Transaction 890 provided in accordance with the principles of the invention. When a client makes a request, using the client ID and the User ID as obtained from 300, the account details are determined from the corresponding user record in the service database (894). Based on the policies for that account, the transaction is completed via standard Account management mechanisms (898). For example, when the client chooses to purchase a movie, and if the Account is a subscribed for a service offering with 10 rentals per month, the cost of the rental is subtracted for that account by the billing process or a credit card authorization process may be used to chard the account for a particular sum for the transaction. In another embodiment, the account and transaction details may be forwarded to a third party billing application for processing via the Service API 215 (896). It is to be appreciated that the nature and type of purchase transaction executed on the backend may be different depending on the application. For the purposes of this invention it is important to note the unique and automatic identification of the client without a need for user input is the key element. Once the requested purchase transaction 890 has been consummated, process 800 may then revert back to tracking user activities at block 830.

Figure 9:
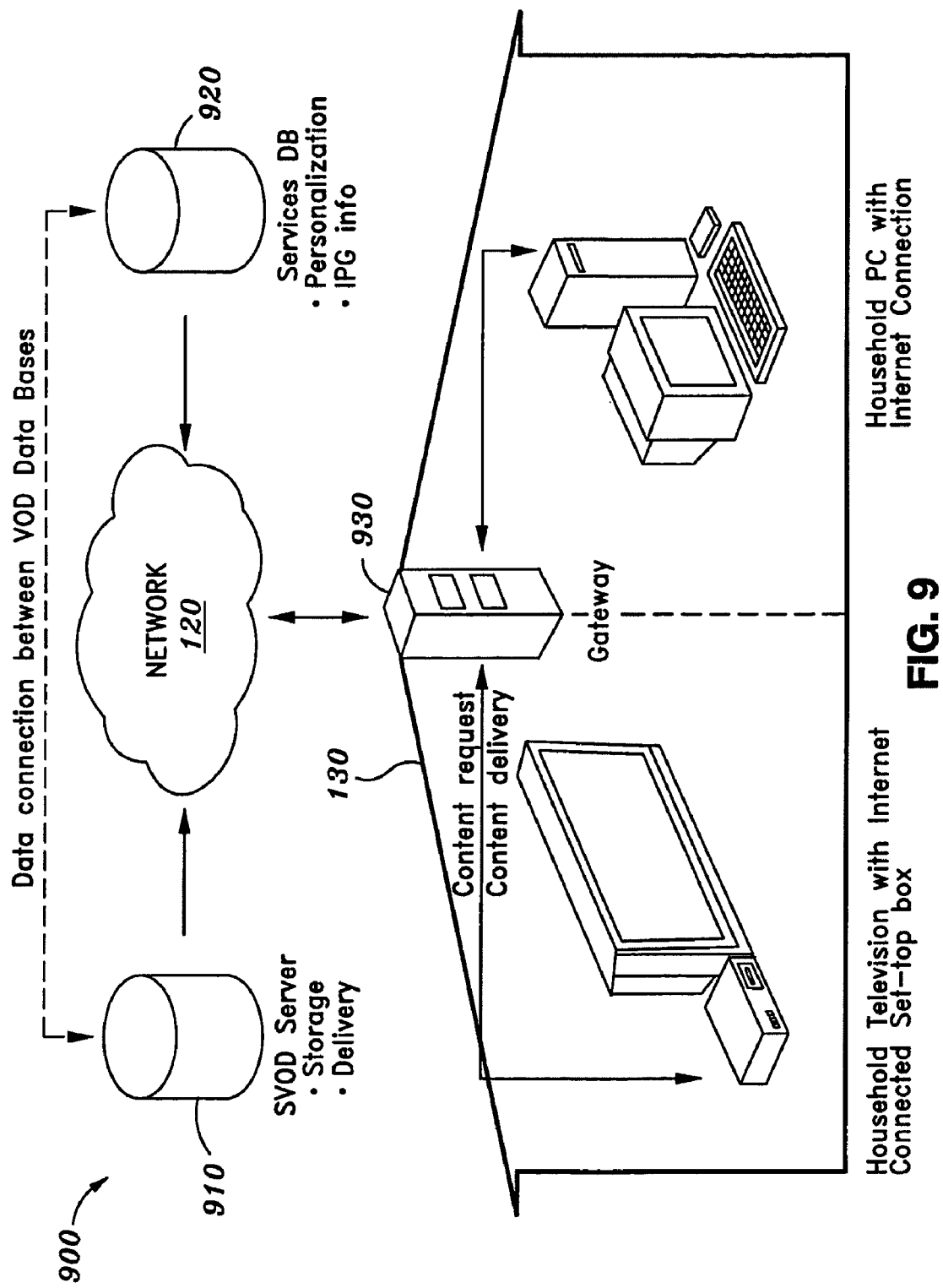
FIG. 9 depicts one embodiment of a system-level diagram depicting the interconnectivity of one or more aspects of the invention.

Referring now to FIG. 9, depicted is one embodiment of a system-level diagram showing how subscription-based video on demand (SVOD) functionality may be provided to a user. In this embodiment, functionality is provided to a client-side system 130 via network 120. In this embodiment, the storage and delivery functionality of back-end server 125 is being filled by SVOD server 910 and Services DB 920. With SVOD server 910 and Services DB 920 coupled to network 120, a user can access/request SVOD content from a client-side system 130 (e.g., via optional gateway 930). While the client-side system 130 comprises a television portion and a PC portion in this embodiment, it should of course be appreciated that the particular devices depicted in FIG. 9 that comprise the client-side system 130 are illustrative only, and numerous other configuration are equally consistent with the principles of the invention. Moreover, although the PC portion of client-side device is shown as being networked to the television portion via gateway 930, content request/delivery operations need not rely on the PC portion where the television portion contains processing logic (e.g., processing logic 150) to carry out client-side processing.

Continuing to refer to FIG. 9, in one embodiment a user may request to purchase VOD content, whether subscription-based or otherwise, using the procedure discussed above with reference to FIG. 8A. For example, at block 860 of FIG. 8A, a user may be presented with VOD purchase options. In one embodiment, the VOD purchase options may be based on previously tracked user activities as previously detailed. In the embodiment of FIG. 9, the user-specific information used to present the VOD purchase options may be contained in and provided by Services DB 920. However, it should equally be appreciated that such options need not be based on user activities, but rather any number of other criteria, including popularity, date of release, etc. Once a user consummates a VOD purchase transaction, as described above with reference to block 880 of FIG. 8A, SVOD server 910 may provide the requested content to the client-side device 130 via network 120, as shown in FIG. 9.

Figure 10A:
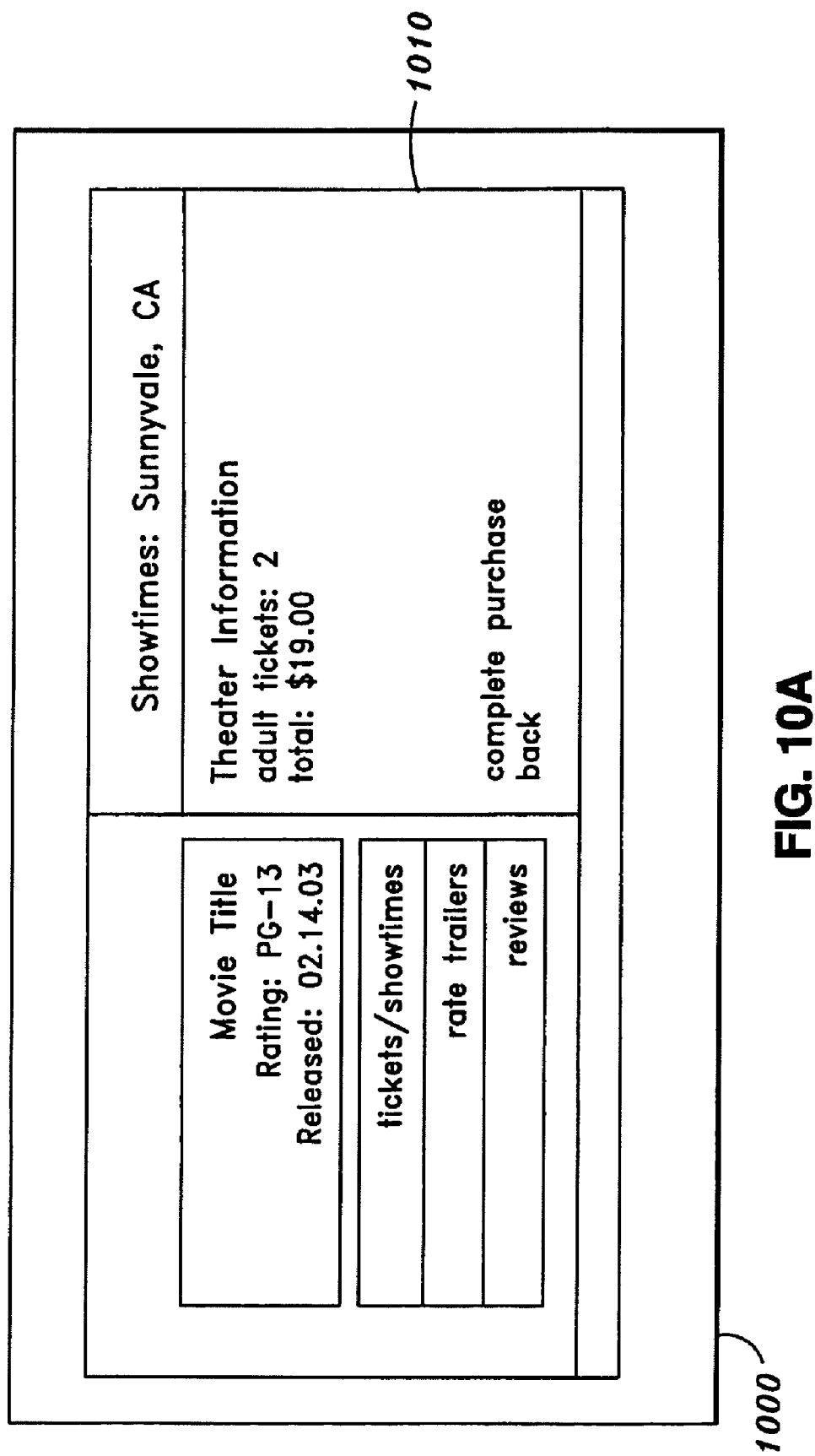
FIGS. 10A-10B depict one or more embodiments of displays which may be used to present purchase options.

Referring now to FIG. 10A, depicted is a display 1000 that may be part of client-side device 130 (e.g., television). In this embodiment, display 1000 may be used to present purchase option information to a user. For example, while viewing content (e.g., a related movie or commercial), overlay 1010 may be displayed to the user either automatically or by the user manually requesting it. The choice to display overlay 1010 may be based on previously user activity (e.g., content accessing/searching) or any number of other criteria as previously discussed. In the embodiment of FIG. 10A, the overlay consists of purchase information for movie tickets. In one embodiment, previously provided user preference/profile information may be used to provide tailored ticket purchase options (e.g., tickets for particular theater location). Similarly, by selecting to purchase the tickets, previously provided payment method information may be used to automatically consummate the transaction. In one embodiment, the purchased tickets may then be either available at the theater for pickup or printable locally by the user.

Figure 10B:
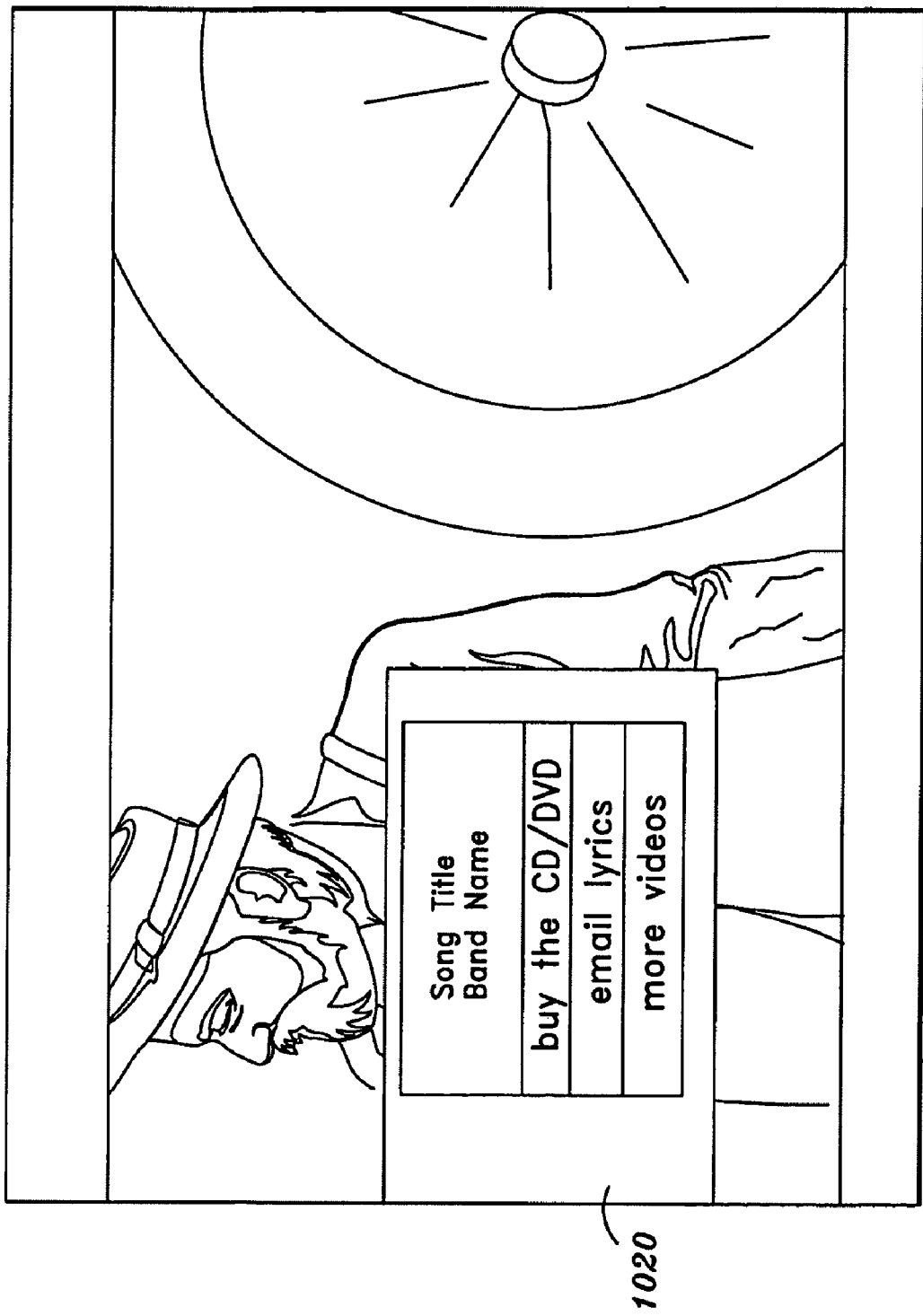

FIG. 10B is another embodiment of display 1000 in which a user is viewing content (e.g., a music video, movie, commercial, etc.) and is presented with a product purchase option. In this embodiment, overlay 1020 is selectively displayed to the user on display 1000 either automatically, based on user profile/preference information, or manually at the direction of the user. Using overlay 1020, a user can issue a purchase transaction request to backend server 125 to purchase the corresponding CD or DVD for the movie or music video being viewed, or for related content based on user profile/preference information. It should of course be appreciated that the product option presented to the user (overlay 1020) may be for any type of product. Moreover, the product option to be displayed may be selected according to any criteria, including but not limited to user profile/preference information. Such information may be entered via an online GUI by the user or determined based on the user activity tracking procedure detailed above with reference to FIG. 8A.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:

1. A method comprising:
   entering a plurality of purchase preferences using a user interface displayed on a user computer that is coupled to the Internet;
   receiving, by a client-side device that includes a set top box that is coupled to the Internet and to a television programming source, user preference data from the Internet and broadcast programming content from the television programming source, said user preference data to be based on said plurality of purchase preferences;
   displaying, on a display of said set top box, a plurality of purchase options based on said plurality of purchase preferences;
   selecting from among said plurality of purchase options using a user input device of said set top box; and
   consummating a purchase transaction using said user input device of the set top box.

2. The method of claim 1, further comprising accessing, using said user interface, a user account prior to said entering the plurality of purchase preferences, said user account to be used to associate said plurality of purchase preferences with a particular user.

3. The method of claim 2, further comprising performing, by said client-side device, a secure logon operation wherein said client-side device is associated with said user account and said plurality of purchase preferences.

4. The method of claim 1, wherein said entering comprises entering the plurality of purchase preferences using the user interface displayed on the user computer that is coupled to the Internet, said plurality of purchase preferences to include at least one of a payment method, product preference information and product delivery information.

5. The method of claim 1, further comprising tracking user activities to establish a user profile, said user preference data to be based on at least one of said plurality of purchase preferences and said user profile.

6. The method of claim 5, wherein said tracking user activities comprises tracking user activities to establish the user profile, said user preference data to be based on at least one of said plurality of purchase preferences and said user profile, where said user activities include at least one of websites visited, online keyword searching, broadcast content viewed, broadcast content searching.

7. The method of claim 1, wherein said displaying comprises displaying, on a display of said client-side device, said plurality of purchase options based on said plurality of purchase preferences, where said plurality of purchase options includes at least one of a list of downloadable/recordable content that is available to purchase, products available to purchase and purchase history.

8. The method of claim 1, wherein said displaying comprises displaying, on a display of said set top box, said plurality of purchase options based on said plurality of purchase preferences, wherein said plurality of purchase options includes subscription-based video on demand (SVOD) purchase options.

9. The method of claim 1, further comprising displaying said plurality of purchase options on said display as an overlay to said broadcast programming content.

10. The method of claim 9, wherein said displaying the plurality of purchase options comprises displaying said plurality of purchase options on the display as said overlay to said broadcast programming content, where said plurality of purchase options are based on said broadcast programming content that is currently being viewed on said display.

11. The method of claim 1, wherein said consummating the purchase transaction comprises consummating the purchase transaction using said user input device of the set top box over a secure connection between said set top box and a server coupled to said data network.

12. The method of claim 11, further comprising:
   making payment to said server where said server is a third-party retailer that is paid according to a payment method contained in said plurality of purchase preferences; and
   delivering a product according to a delivery method contained in said plurality of purchase preferences.

* * * * *